Aug. 27, 1957    B. J. NIGRELLI ET AL    2,803,932
MACHINE FOR LOADING OPEN END CARTONS
Filed May 9, 1956                         13 Sheets-Sheet 1
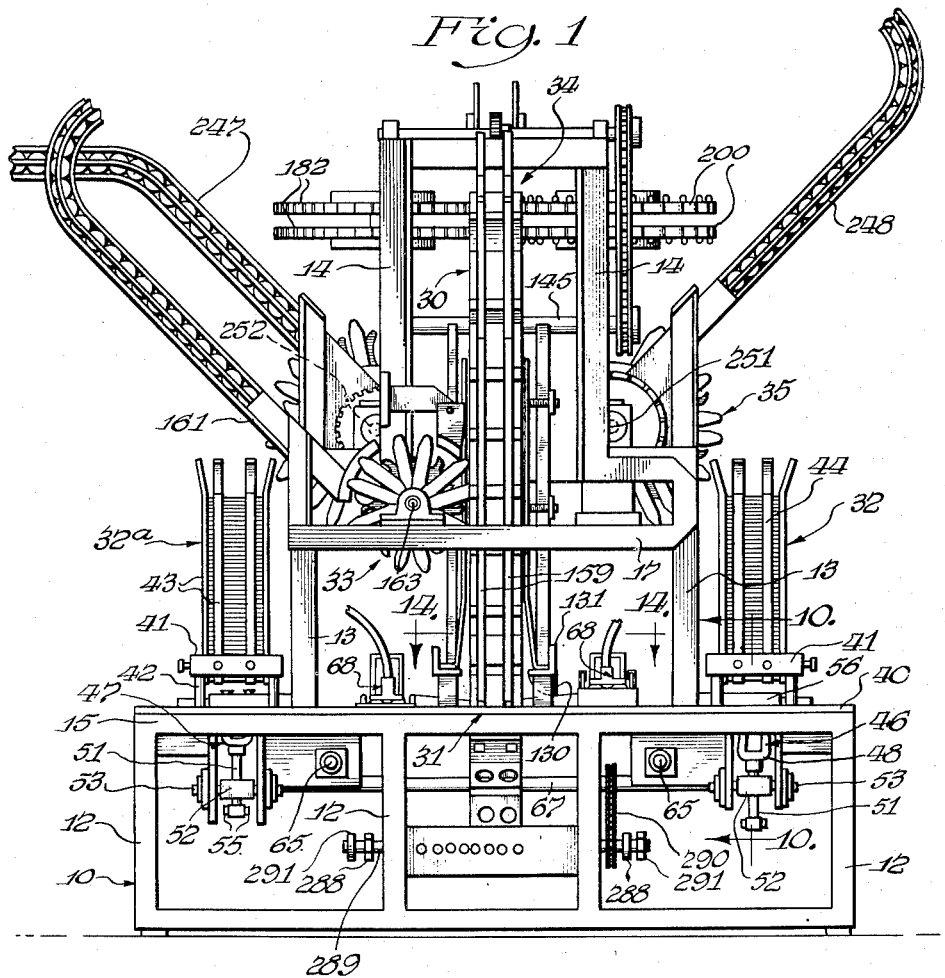
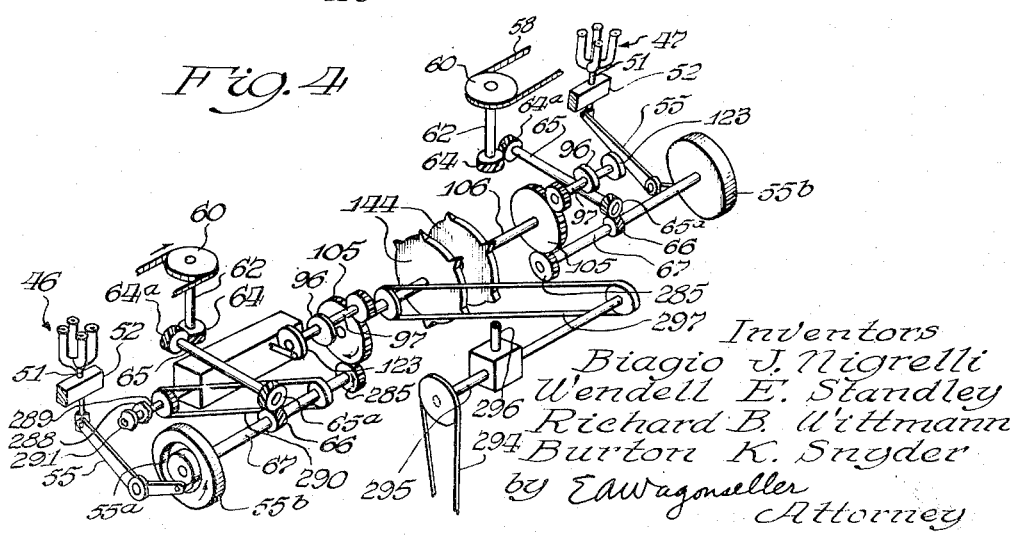

Aug. 27, 1957  B. J. NIGRELLI ET AL  2,803,932
MACHINE FOR LOADING OPEN END CARTONS
Filed May 9, 1956  13 Sheets-Sheet 2
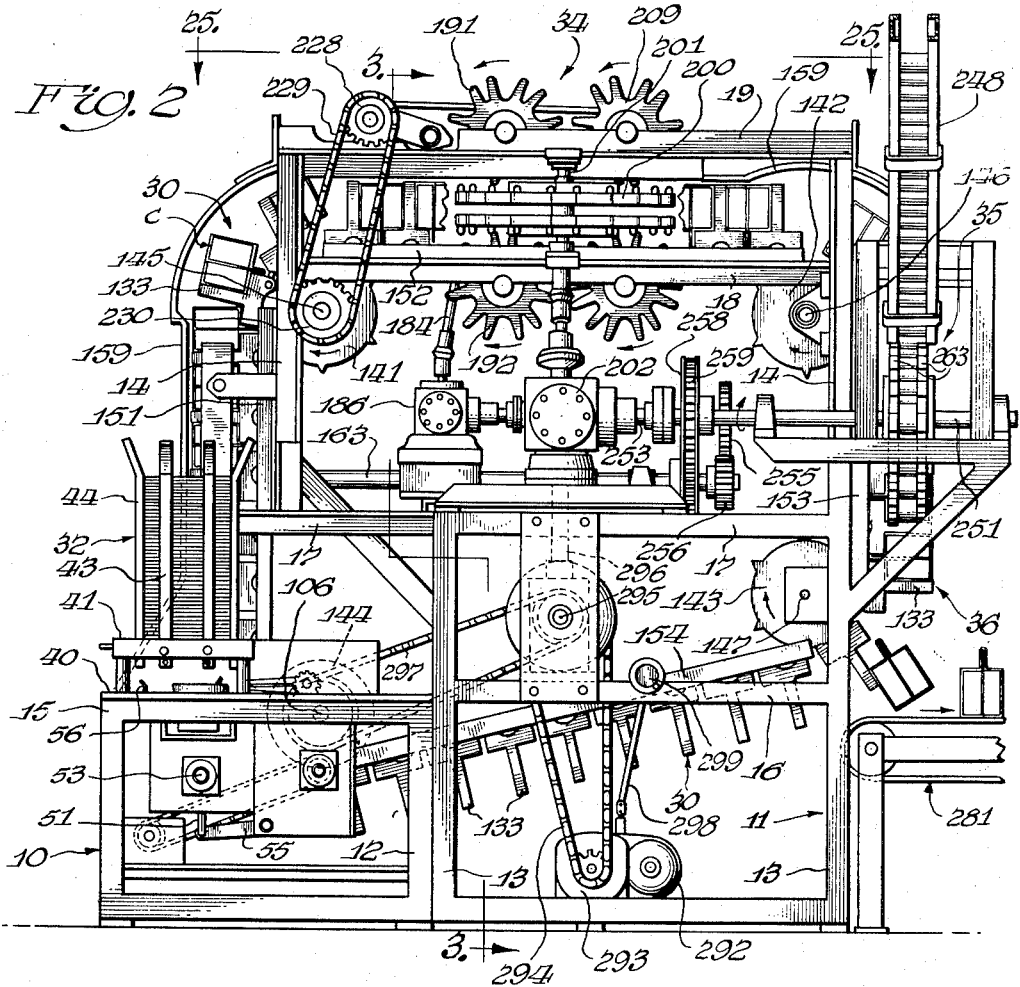
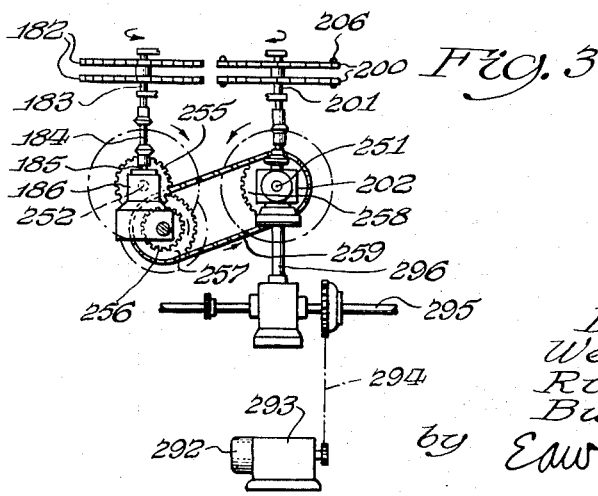
Inventors
Biagio J. Nigrelli
Wendell E. Standley
Richard B. Wittmann
Burton K. Snyder
by E. W. Wagonseller
Attorney Aug. 27, 1957     B. J. NIGRELLI ET AL     2,803,932
MACHINE FOR LOADING OPEN END CARTONS
Filed May 9, 1956                               13 Sheets-Sheet 3
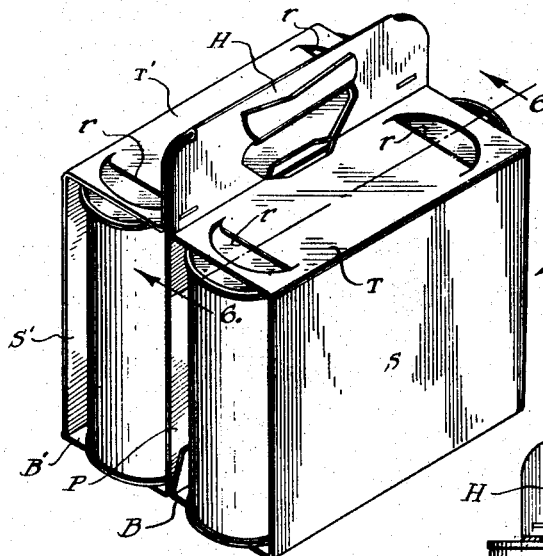
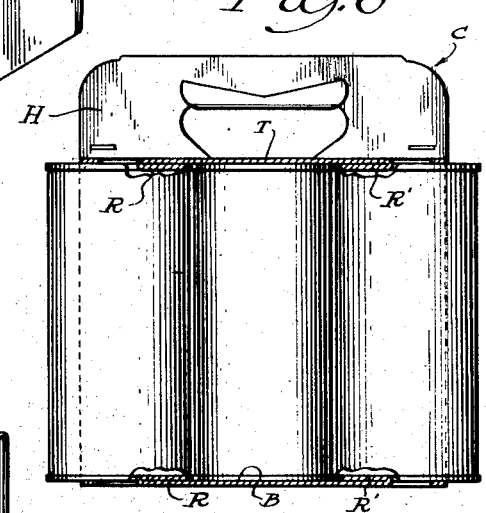
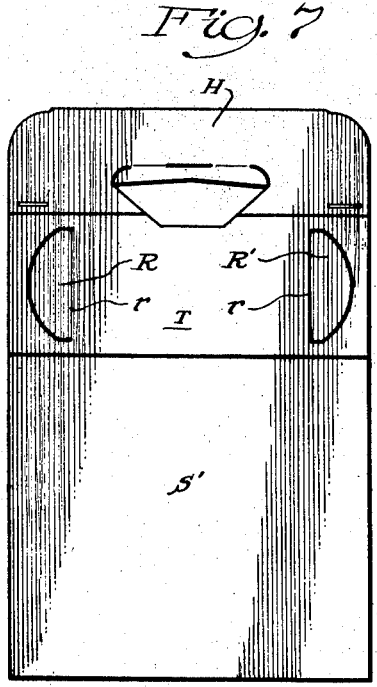
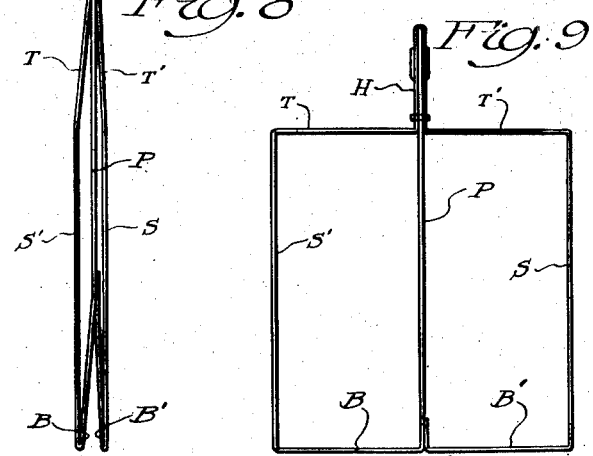
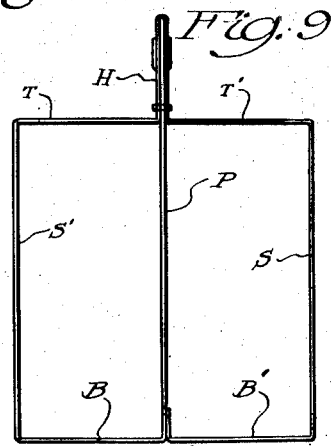
Inventors
Biagio J. Nigrelli, Wendell E. Standley
Richard B. Wittmann, Burton K. Snyder
by Ed Wagmueller
Attorney Aug. 27, 1957   B. J. NIGRELLI ET AL   2,803,932
MACHINE FOR LOADING OPEN END CARTONS
Filed May 9, 1956   13 Sheets-Sheet 4

Inventors
Biagio J. Nigrelli
Wendell E. Standley
Richard B. Wittmann
Burton K. Snyder
by E. A. Wagonseller
Attorney

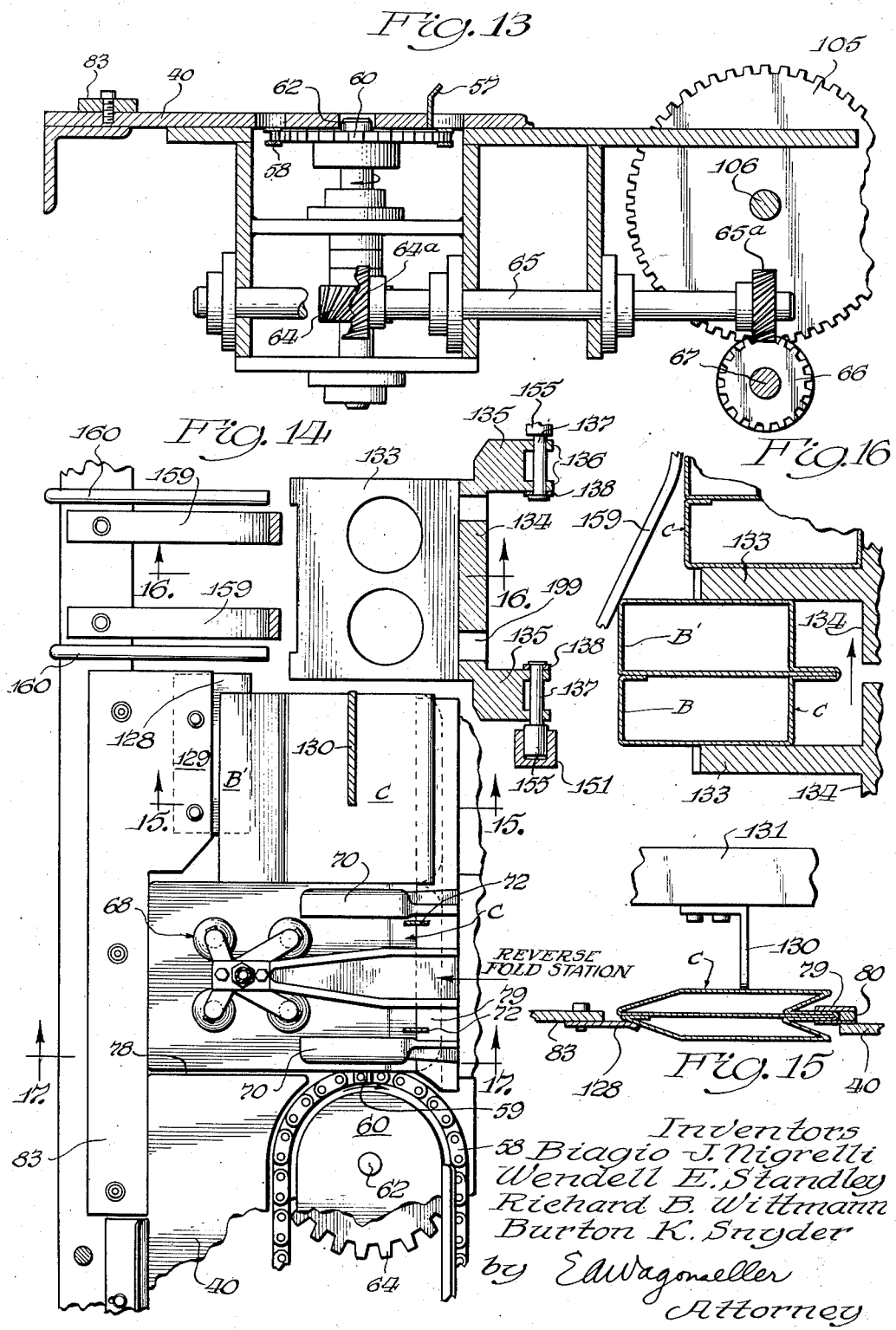

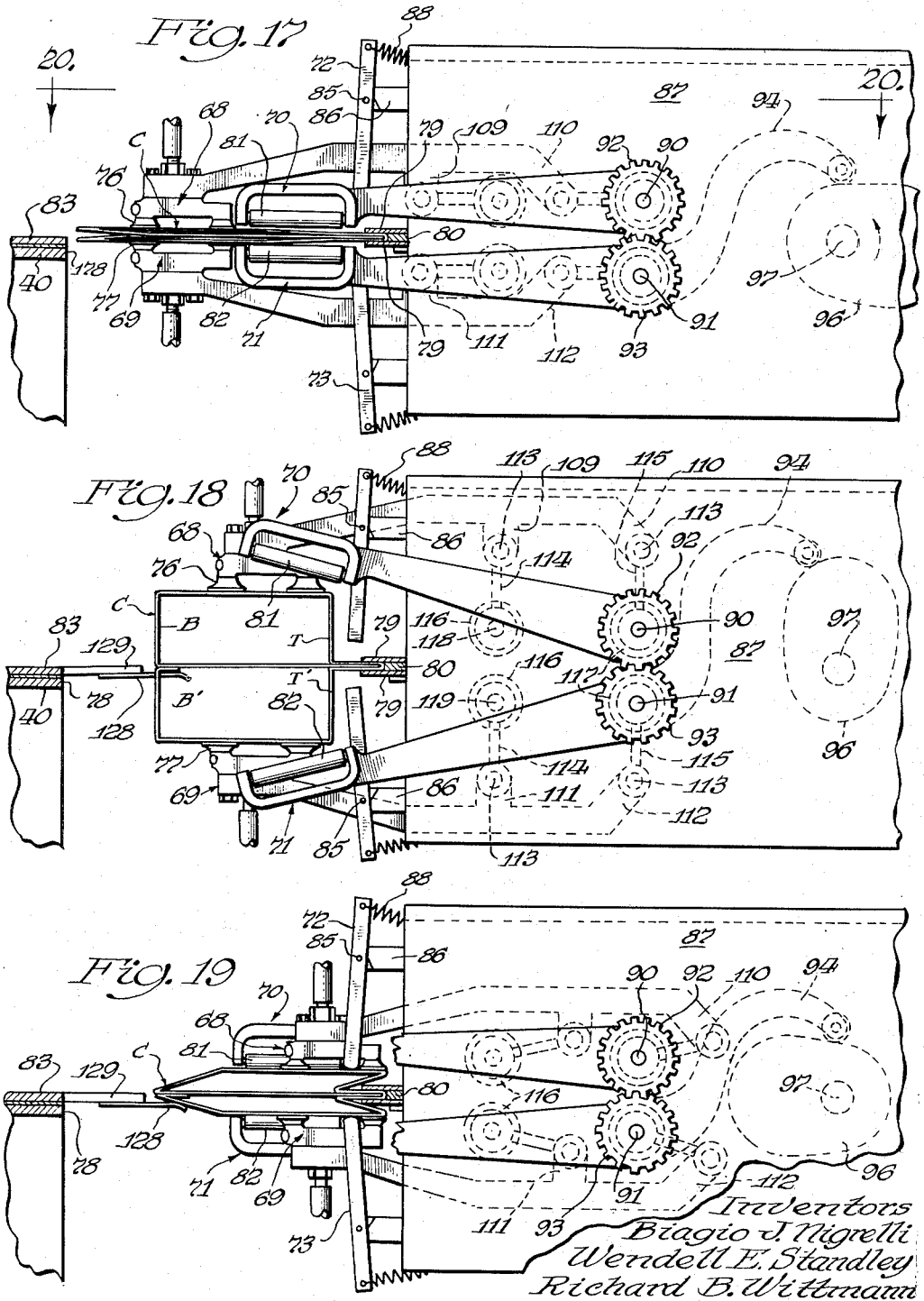

Aug. 27, 1957     B. J. NIGRELLI ET AL     2,803,932
MACHINE FOR LOADING OPEN END CARTONS
Filed May 9, 1956     13 Sheets-Sheet 7
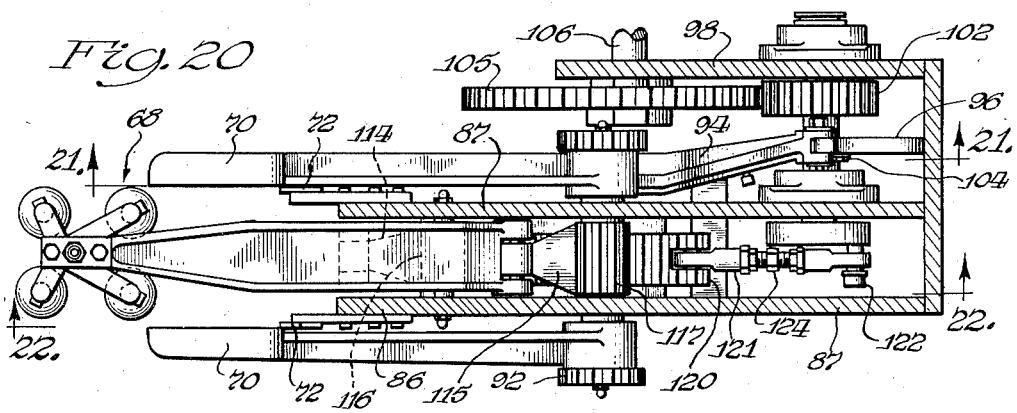
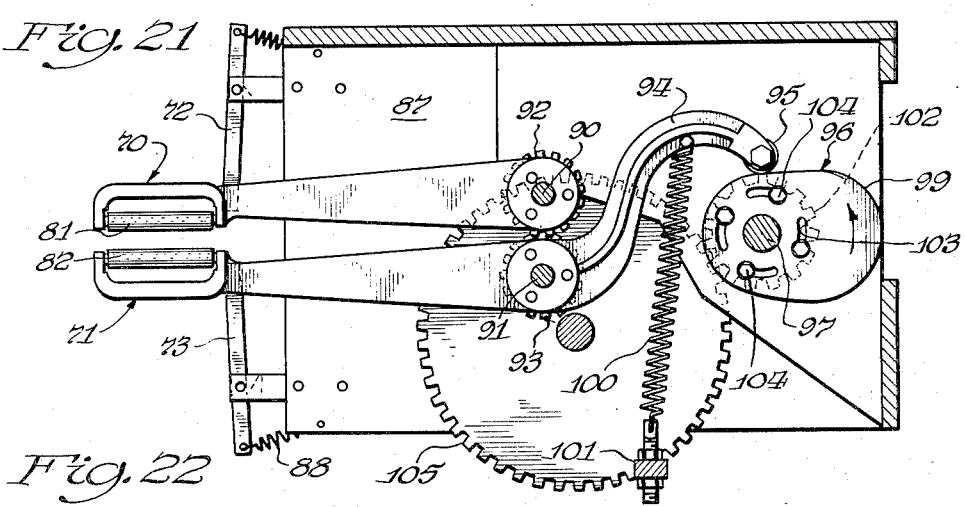
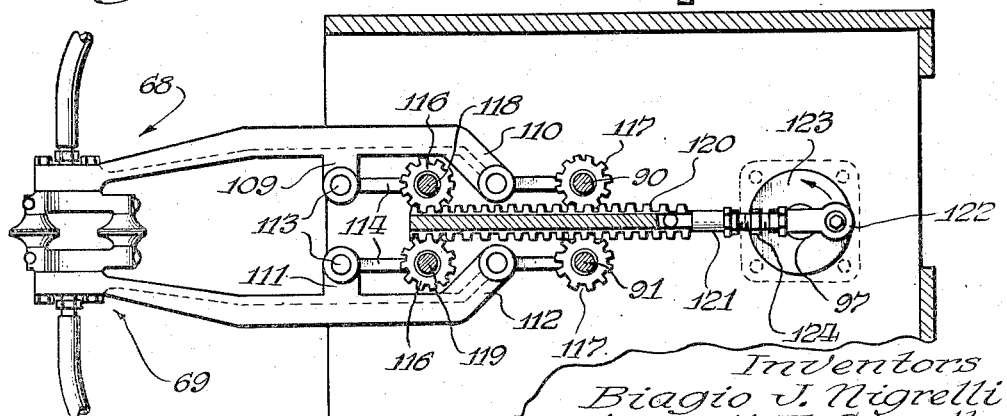
Inventors
Biagio J. Nigrelli
Wendell E. Standley
Richard B. Wittmann
Burton K. Snyder
by E. A. Wagonseller
Attorney Aug. 27, 1957   B. J. NIGRELLI ET AL   2,803,932
MACHINE FOR LOADING OPEN END CARTONS
Filed May 9, 1956   13 Sheets-Sheet 8

Inventors
Biagio J. Nigrelli
Wendell E. Standley
Richard B. Wittmann
Burton K. Snyder
by Ed Wagoneller Attorney

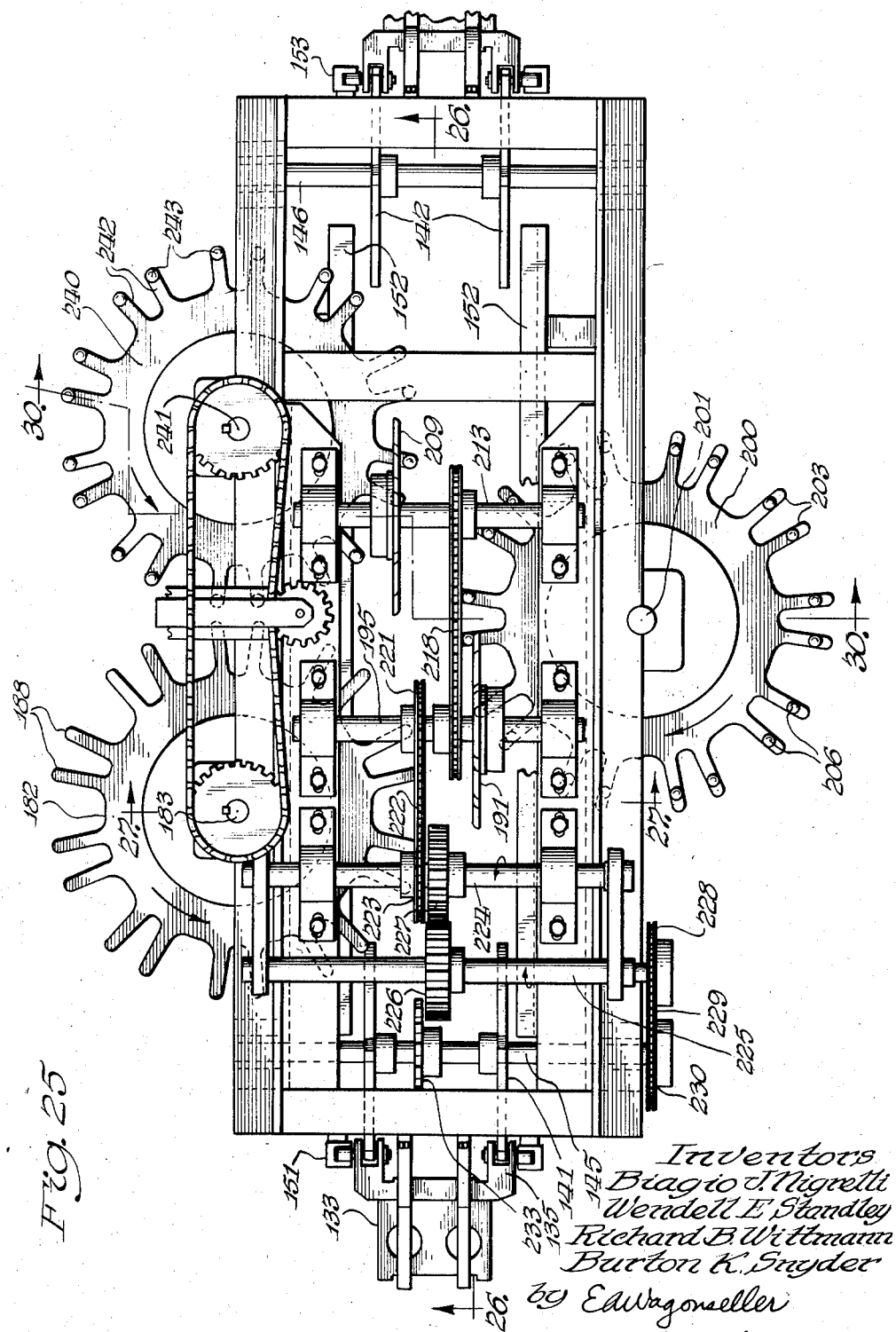

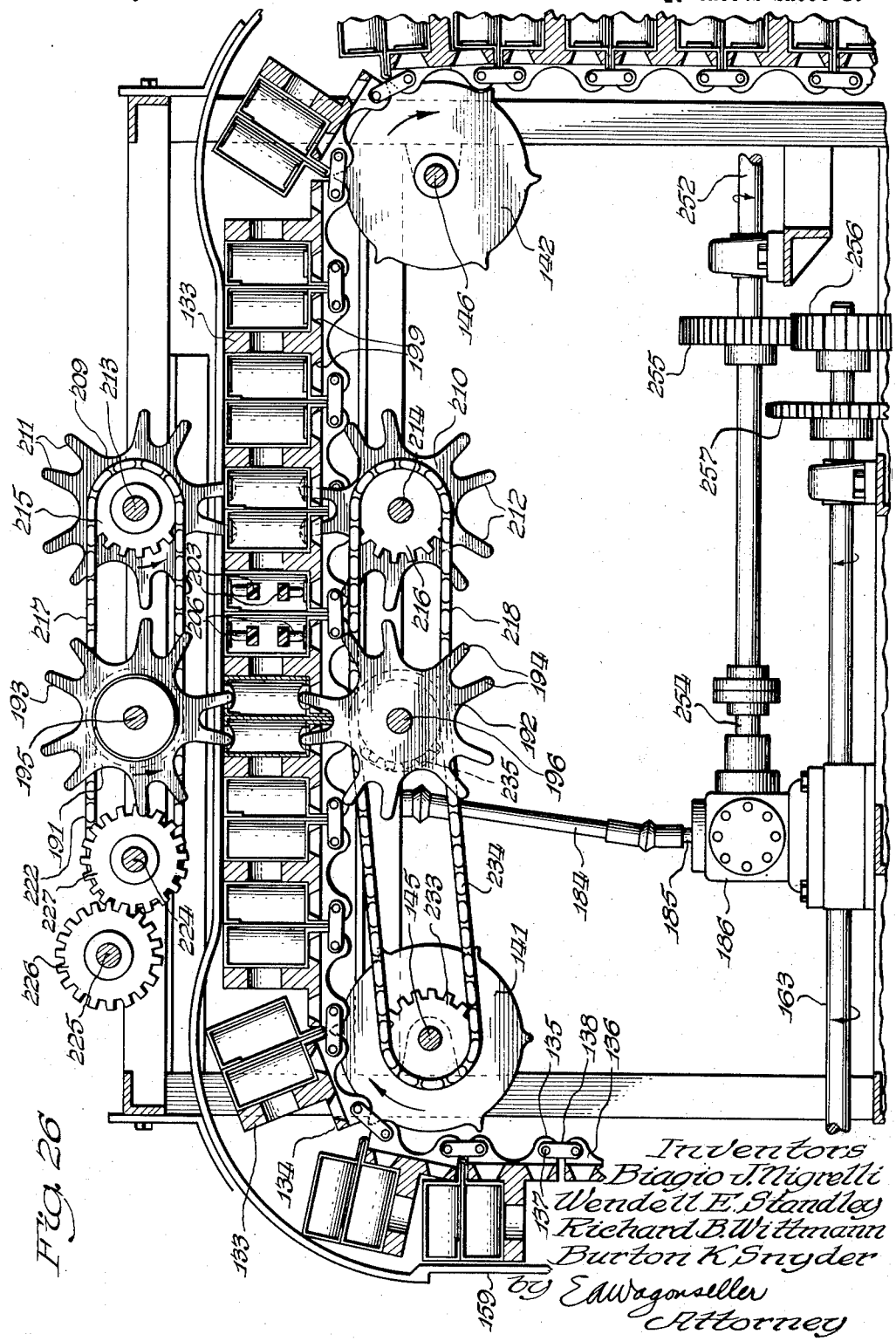

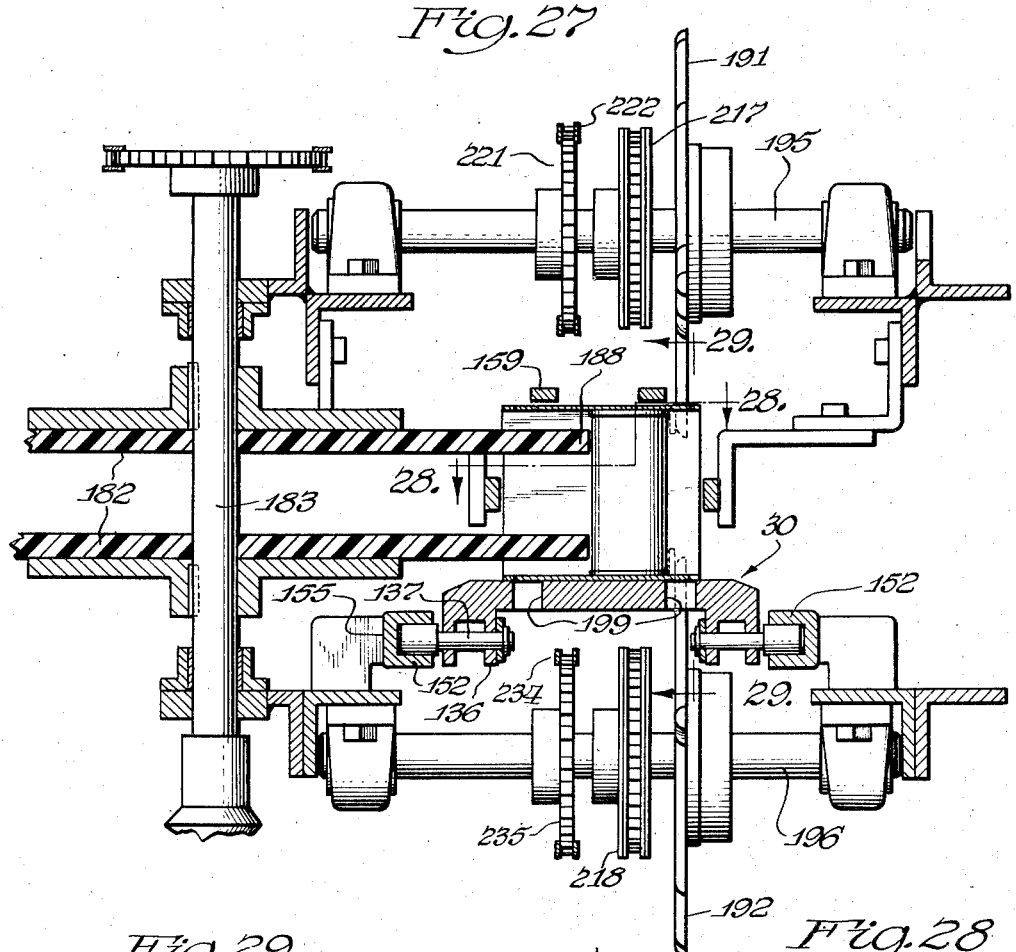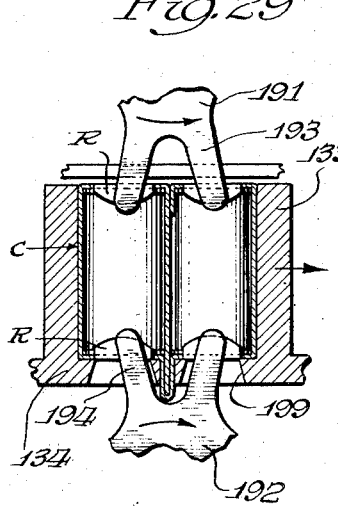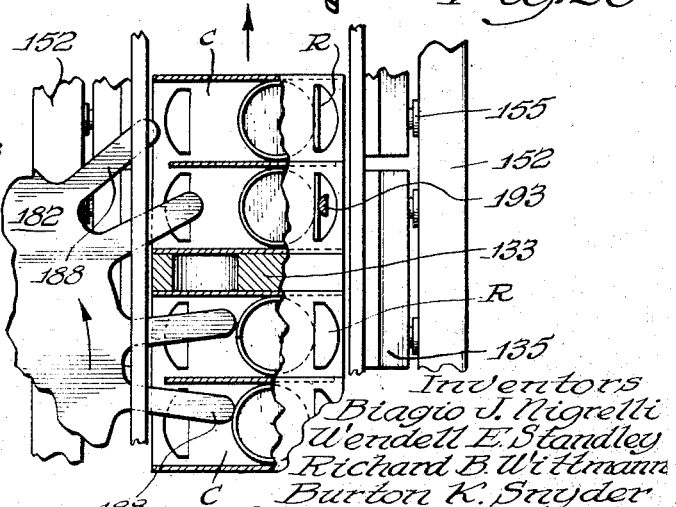

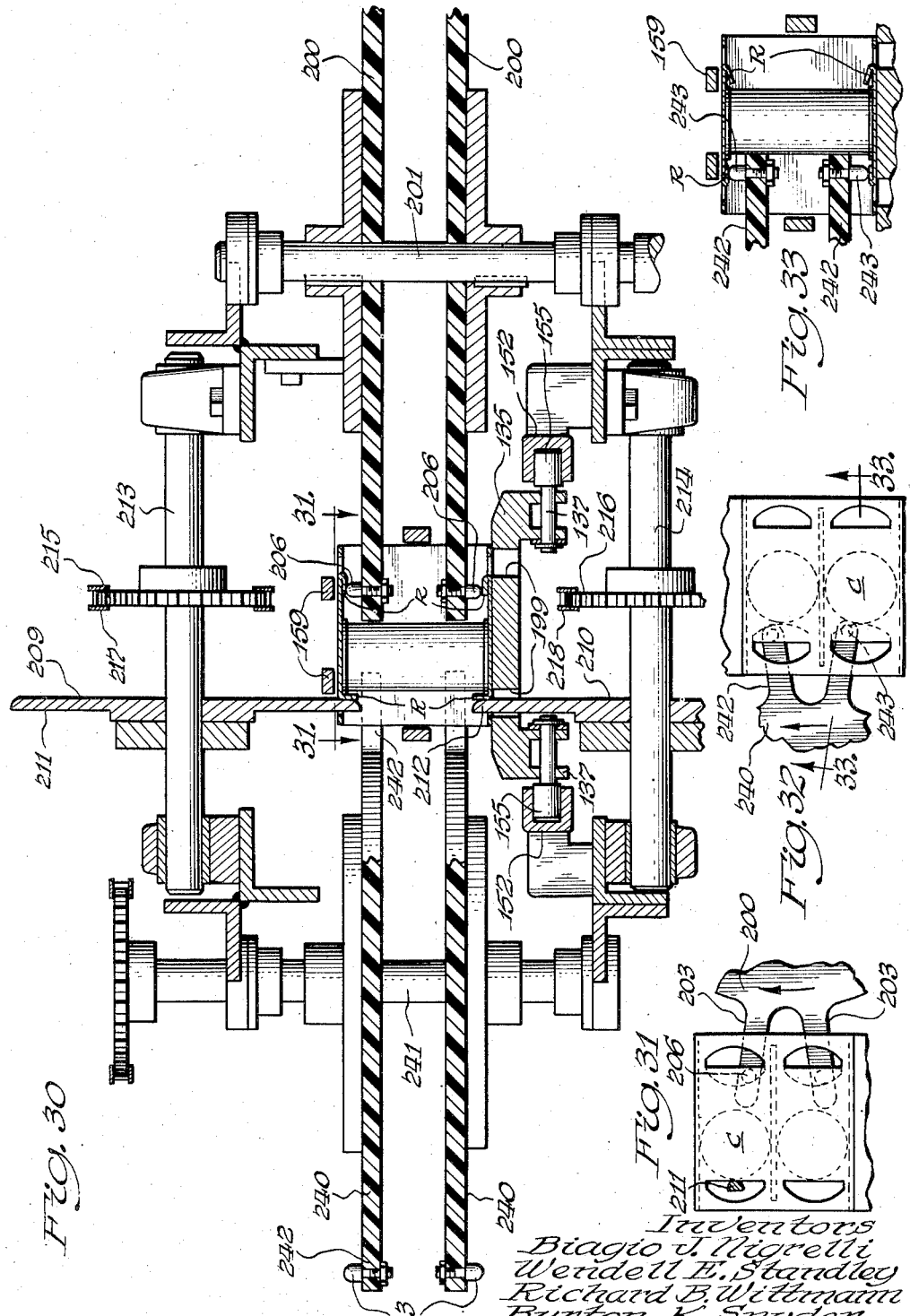

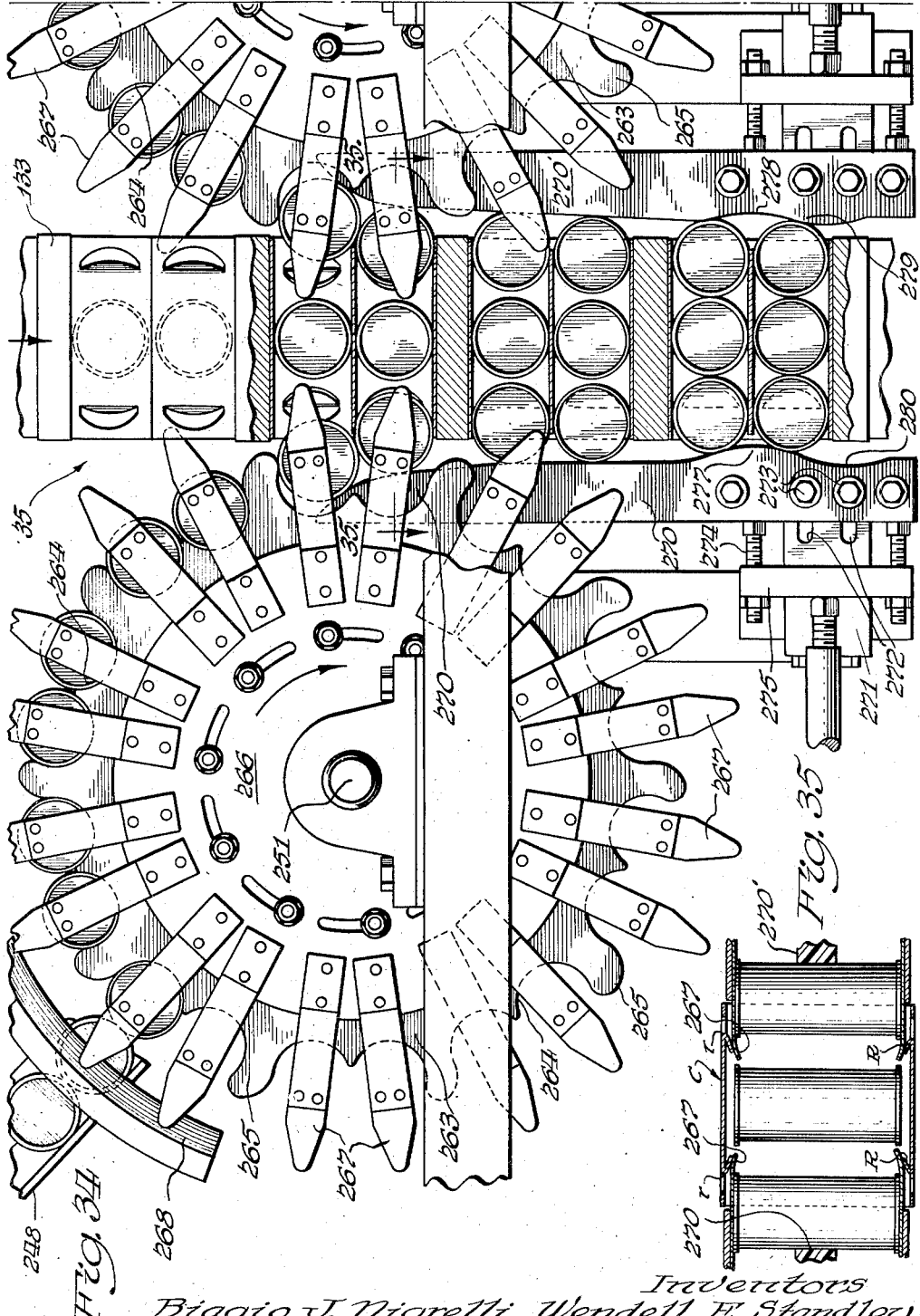

United States Patent Office  2,803,932
Patented Aug. 27, 1957

2,803,932

MACHINE FOR LOADING OPEN END CARTONS

Biagio J. Nigrelli, Skokie, Wendell E. Standley and Richard B. Wittmann, Chicago, and Burton K. Snyder, Clarendon Hills, Ill., assignors to Ralph W. Johns, Biagio J. Nigrelli, and Robert R. Johns, Chicago, Ill., a copartnership Application May 9, 1956, Serial No. 583,866

19 Claims. (Cl. 53—186)

This invention relates to the loading of cans or similar generally cylindrical containers into open ended, tubular cartons or sleeves of rectangular section of the type having integral retaining tabs formed adjacent to the edges of the top and bottom walls of each of the open carton ends, and which are folded in during loading of the cartons to engage and retain the cans against movement out of the carton ends. More particularly, the invention relates to an automatic machine adapted to feed and set up folded cartons from a supply stock, pre-break and fold the tabs thereof into position to permit cans to move past such tabs, load the cans into the cartons and discharge the loaded cartons, and to perform the successive operations in a smooth and continuous movement. Additionally, the invention relates to a machine adapted to load cans into cartons adapted to contain two adjacent rows of cans, such cartons preferably being formed with a center partition wall dividing the carton into two juxtaposed compartments. Thus, the invention contemplates improvements on prior practices in the loading of cans in two rows within tubular cartons and in machines for the purpose such, for example, as the machine shown and described in the United States Patent to Biagio J. Nigrelli, No. 2,770,935, issued November 20, 1956, entitled "Carton Loading Machine" and assigned to the assignees of the present invention.

The machine of the present invention comprises an arrangement of operating parts for effecting in order the various steps necessary for the continuous loading of two rows of cans into cartons and the discharge of the loaded cartons, all mounted on a suitable frame and driven and controlled in timed relation to provide greater output more efficiently and cheaply. The mechanism includes a loading and discharging conveyor vertically disposed centrally of the machine, having an ascending leg at the front of the machine, and a descending leg at the rear thereof, and provided with spaced members which define pockets adapted to receive and support erected cartons. The conveyer is driven continuously to move the pocket forming members past carton receiving stations located on opposite sides of the ascending leg near the lower end thereof and thereafter past can receiving stations on opposite sides of the conveyer. The loaded cartons are automatically released from the conveyer at a discharge station located on the descending leg at a point below the last loading station.

The collapsed or folded cartons are withdrawn from suitable magazines or stacks located on opposite sides of the ascending leg of the conveyer at the front of the machine and are erected by suitable mechanism which brings the cartons first to expanded condition and then to a reversely folded condition, tending to break the fold lines effectively and counteract the tendency of the carton walls to return to their original folded or collapsed positions. After the cartons have been reversely folded they are released to permit the walls to move toward expanded position. The cartons, prior to coming to expanded position, are fed one at a time into the conveyer pockets. Alternate conveyer pockets are supplied with cartons from opposite sides of the machine, each carton feed mechanism being designed and controlled so as to deliver a carton into every other conveyer pocket.

The machine is designed to load three cans into each compartment of a two-compartment carton and has means adjacent the ascending leg of the carton conveyer for loading a single can into each compartment. This loading mechanism comprises a rotatable turret member formed with rounded notches, each of which is adapted to receive a can in horizontal position delivered from a can supply device. The turret is located in a substantially tangential relation to the path of the open ends of the cartons on the carton conveyer and it is continuously driven at the same speed and in the same direction as the conveyer, so that each can in succession may be transferred adjacent the point of tangency into the corresponding carton compartment through the open end thereof. Positive means are provided to effect transfer of the cans from the turret to the carton compartments.

Additional turrets are provided on opposite sides of the descending carton conveyer leg to load a can at each end of each compartment so that the carton will be completely loaded with six cans—three in each compartment.

Means are provided for properly folding the can retaining tabs on the cartons, such tabs being of the internal type, that is, they are located a short distance inward from the edges of the walls forming the open ends of the cartons and are cut from within the contour of the walls. This folding of the internal retaining tabs is accomplished after one can has been loaded into each compartment. The inserted can is moved to such position that its leading edge is located inwardly of the tab hinges to provide support for the top and bottom walls while the tabs are folded out of the plane of their supporting walls. Rotating finger wheels on horizontal axes are provided to engage and fold the tabs through a substantial angle relative to their attached walls while such walls are supported from deflection by the can ends. Means are next provided to move the individual cans lengthwise of each compartment so they will come to rest with their leading portions adjacent the hinges of the tabs at the other ends of the compartments. Additional rotating finger wheels engage the remaining tabs and fold them at substantially right angles to their walls while such walls at this end of the carton are supported from deflection by the can ends.

Means are provided for folding the tabs through a remaining angle so that a total tab swinging movement of approximately 180° is obtained. The cartons, being thus conditioned to receive and retain two additional cans in each compartment, are carried past two additional loading mechanisms, located on opposite sides of the descending leg of the carton conveyer, where one additional can is inserted into each end of each compartment. The loaded cartons are then carried to the discharge point where they are delivered to any suitable means such as an off-bearing conveyer.

An important object of this invention is to provide simple, sturdy and effective mechanisms for loading a double row of cans into open end cartons, formed either with or without centrally disposed upstanding handles, in a smooth, continuous motion, whereby a relatively high speed of loading can be obtained.

Another object of the invention is to provide simplified means for pre-breaking the retaining tab fold lines to condition the cartons for reception and retention of cans, such means utilizing a can that has been inserted into the carton as a means for holding firmly the tab carrying walls so that, as the tab is folded out of the plane of its wall there will be no tendency to tear or unduly distort the tab or wall.

Another object of the invention is to provide effective loading means for the initial cans to be loaded into cartons which have internal retaining tabs so that the cans may be introduced successfully into the carton before the pre-breaking of the tab fold lines takes place.

Another object of the invention is to provide loading mechanism for two-compartment cartons with upstanding, centrally positioned handle panels which will readily accommodate the upstanding handle and maintain it in a position to prevent interference with other parts of the mechanism which conveys and loads the cartons.

A further object is to provide effective mechanism for pre-breaking the carton fold lines between the various side, bottom, top and partition walls of a carton of the type herein disclosed, as well as means and mechanism for delivering a carton so treated to a carton conveyor in expanded, or can retaining, form.

A still further object of the invention is to provide mechanism operative after the cartons are fully loaded and prior to discharge of the loaded carton to move each row of cans bodily with respect to the carton by a small degree to assure proper locking of the retaining tabs with the can chimes.

Other and more general objects are to improve and render more efficient the carton conditioning means for placing internal retaining tabs in proper position so that the conditioning of the cartons may be done rapidly, accurately, and without likelihood of tearing or undue distortion of the cartons.

Other objects of the invention will be apparent from the specification taken in connection with the drawings which form a part hereof and in which:

Fig. 1 is a front elevation of a carton loading machine embodying the present invention;

Fig. 2 is a side elevation of the machine, viewed from the right hand side of Fig. 1;

Fig. 3 is a fragmentary detail view, on a reduced scale, taken substantially on line 3—3 of Fig. 2, illustrating the tab folding finger wheels and driving means therefor;

Fig. 4 is a fragmentary, and somewhat schematic, isometric view of the driving transmission for the expanded carton conveyor and for the suction cup mechanism for withdrawing folded cartons from the carton supply magazines;

Fig. 5 is an isometric view of a carton for which the machine of the present invention is adapted, showing the carton as it appears when loaded with six cans;

Fig. 6 is a vertical sectional view, taken along line 6—6 of Fig. 5;

Fig. 7 is a plan view of the carton in folded or collapsed condition showing the carton as received from the carton factory and ready for introduction into the carton magazine;

Fig. 8 is an edge view of the carton illustrated in Fig. 7, showing the side walls slightly separated from the center partition wall for clearness of illustration;

Fig. 9 is an edge view of the carton with side walls in fully expanded condition;

Fig. 13 is a vertical, fragmentary sectional view taken substantially on line 13—13 of Fig. 11, illustrating details of the driving means for the flat carton conveyer;

Fig. 14 is a horizontal, fragmentary sectional view, taken approximately along line 14—14 of Fig. 1, showing a carton positioned ready to be expanded by the carton opening mechanism and another carton just beyond the first carton and in reversely folded, partially collapsed condition just prior to its being delivered to the carton loading conveyer;

Fig. 15 is a fragmentary detail sectional view, taken on line 15—15 of Fig. 14, looking in the direction of the arrows, showing the reversely folded carton;

Fig. 16 is a fragmentary detail sectional view taken on line 16—16 of Fig. 14, showing a part of the expanded carton conveyer structure forming pockets into which the cartons are delivered by a lateral movement at right angles to the conveyer movement;

Fig. 17 is a fragmentary detail vertical sectional view, taken on line 17—17 of Fig. 14, illustrating the suction cup opening mechanism for the flat, collapsed cartons in position just prior to initiation of the expanding operation;

Fig. 18 is a fragmentary view, similar to Fig. 17, illustrating the carton as it is being acted upon by the mechanism to bring it to fully expanded condition;

Fig. 19 is a fragmentary view, also similar to Fig. 17, illustrating the mechanism as it appears after bringing the carton substantially to a reversely folded condition;

Fig. 20 is a fragmentary horizontal detail sectional view, taken along line 20—20 of Fig. 17, illustrating the carton opening and reverse folding mechanism as it appears from above;

Fig. 21 is a detail vertical sectional view, taken along line 21—21 of Fig. 20, illustrating the driving mechanism for the carton guiding and supporting areas which assist in supporting the carton while enroute to the expanded carton conveyor;

Fig. 22 is a fragmentary sectional view, taken on line 22—22 of Fig. 20, illustrating the mechanism for operating the suction cup arms for expanding and reverse folding of the carton;

Fig. 25 is a top plan view with certain parts of the conveyor omitted and with certain members partially broken away, illustrating the upper group of finger wheels which function to position the cans in a desired manner within the cartons and which fold the tabs over at approximately 180°;

Fig. 26 is a vertical sectional view, taken along line 26—26 of Fig. 25, illustrating the four vertically disposed finger wheels for initially deflecting the can retaining tabs in the top and bottom carton walls at each end of the carton;

Figure 10:
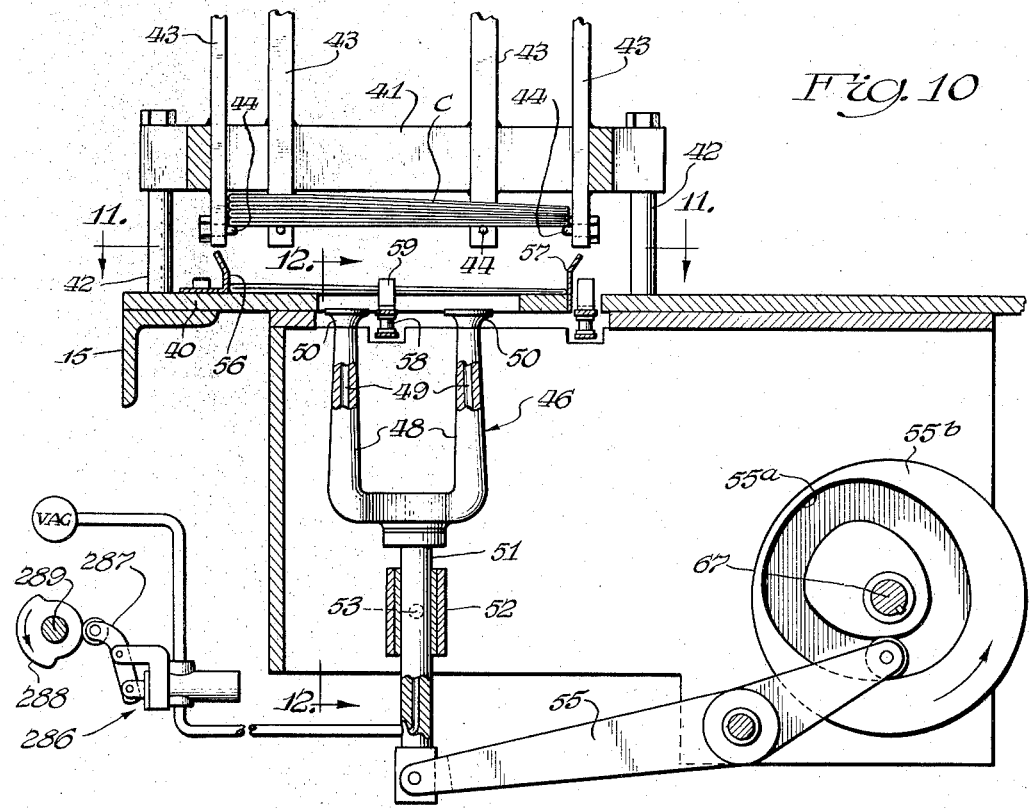
Fig. 10 is a fragmentary side elevational view taken partly in section along line 10—10 of Fig. 1, looking in the direction of the arrows, showing the flat carton magazine, the carton withdrawing member and the conveyer for carrying the flat cartons past fold line pre-breaking mechanism toward the expanded carton conveyer.

Fig. 27 is a vertical sectional view taken along line 27—27 of Fig. 25, looking in the direction of the arrows, illustrating how the fingers on the horizontally disposed finger wheel enter the carton and slide the initially deposited can over to act as a supporting member for the top and bottom walls at one end of the carton preparatory to the action of the vertically disposed finger wheels in deflecting the retaining tabs through a 90° angle;

Fig. 28 is a fragmentary detail view, taken partly in section along line 28—28 of Fig. 27, looking in the direction of the arrows, showing the fingers on the finger wheel positioning the cans within the cartons and showing the folding of the tabs in the carton top wall at one end;

Fig. 29 is a fragmentary detail sectional view, taken on line 29—29 of Fig. 27, showing the tab folding fingers which are also seen in Figs. 27 and 28;

Fig. 30 is a vertical sectional view, taken on line 30—30 of Fig. 25, looking in the direction of the arrows, illustrating two sets of horizontally disposed finger wheels for repositioning the cans and for folding the can retaining tabs through the remainder of approximately 180° following the first folding of 90°;

Fig. 31 is a fragmentary detail sectional view, taken on line 31—31 of Fig. 30, showing how the first horizontally disposed finger wheel serves the dual function of repositioning the cans and completing the 180° folding of the tabs at one end of the carton;

Fig. 32 is a fragmentary detail view showing how the fingers on the second horizontally disposed finger wheel serve to reposition the first introduced cans centrally of the compartments and to complete the 180° folding of the tabs at the opposite end of the carton;

Fig. 33 is a fragmentary detail sectional view, taken on line 33—33 of Fig. 32, showing the operation of the tab folding pins on the fingers of the finger wheel and illustrating the final positioning of the can and final conditioning of the retaining tabs preparatory to the introduction of one additional can at each end of each carton compartment;

Fig. 34 is a fragmentary rear elevational view on an enlarged scale, showing the bottom portions of the cartons and portions of the conveyer broken away, illustrating the loading of two additional cans in each compartment by means of star wheels, and showing how the rows of cans are given a final slight shifting movement within the carton to insure engagement with the retaining tabs; and Fig. 35 is a detail sectional view taken on line 35—35 of Fig. 34, looking in the direction of the arrows, to illustrate how the spring fingers on the star wheels enter the ends of the cartons to guide the can chimes past the retaining flaps. In this view for the sake of greater clarity the relationship of the walls of the carton to the can ends is somewhat distorted, as in practice the can ends are snugly engaged by the top and bottom carton walls.

This invention provides a can loading machine which is particularly adapted to operate with open ended, tubular or sleeve-type cartons having two separate compartments defined from each other by a partition wall extending parallel with the tubular axes of the open ended compartments. There are two common forms of these cartons, one having no handle and the other with a handle that is formed from a panel of paperboard extending centrally of the upper wall of the carton in the plane of the center partition. Such a carton is illustrated in Figs. 5 to 9 inclusive, and is indicated as a whole at C. It comprises a two-part top wall T and T', a two-part bottom B and B', side walls S and S', a partition wall P, a handle panel H, and can retaining tabs R and R' on the respective top and bottom panels. The retaining tabs are cut from the top and bottom panels and are foldably connected along crease or score lines r. An example of a carton construction of this type is disclosed in the patent to George H. Parker, No. 2,614,737, issued October 21, 1952.

The carton is constructed in flat folded condition, as illustrated in Fig. 8, with the top walls folded down away from the handle and lying adjacent the partition. The bottom walls, likewise are folded down and lie adjacent each other. The carton is brought to expanded condition by swinging the side walls upward until the side, bottom and top walls are brought into right angular form, as shown in Fig. 9. When the can retaining tabs are folded to lie substantially flat against the top and bottom walls respectively and cans have been inserted within the carton compartments as illustrated, the free edges of the retaining tabs will engage the chimes of the outer cans and retain them from endwise movement out the open ends of the cartons.

Referring to Figs. 1 and 2, the operating parts of the loading machine, as herein illustrated, are supported on base frame members, indicated as a whole at 10 and 11, including suitable upright members 12, 13 and 14, and horizontal members 15, 16, 17, 18, and 19. The frame members comprise angle bars, channels plates and bracing members which are welded or otherwise rigidly secured together for supporting the various operating mechanisms and driving gears, all in a manner that is well known.

Centrally located in the machine frame is a carton conveyer 30 for the expanded cartons, arranged to travel in a vertical plane. At the front of the machine a leg of the conveyer travels vertically upward past a loading station 31 where expanded cartons, delivered in flat form from storage magazines 32 and 32a are loaded into pockets in the conveyer. The expanded cartons are carried upward by the conveyer past a can loading station 33 where a single can is delivered to each compartment of each carton. The conveyor 30 then travels along a horizontal path in the upper part of the machine frame to carry the cartons past retaining tab conditioning members at station 34. The conveyer then carries the cartons on a descending leg past the final can loading station 35 where two cans are introduced into each compartment, preferably one at each open end. The filled cartons are then carried downwardly past a discharge station 36, after which the empty conveyer moves along a slightly inclined path to the front of the machine to repeat the cycle.

*Carton feeding mechanism*

The mechanism for feeding cartons is best shown in Figs. 1, 2, 4, 10, 11 and 12. As shown in Fig. 10 a flat plate 40, secured to the horizontal frame members, has supported thereon two flat-carton storage magazines 32 and 32a, one being located on each side of the loading conveyor. Means are provided for withdrawing flat-folded cartons downwardly from the bottom of the magazines and carrying them one at a time toward the loading conveyer. The magazines each comprise a suitable base frame member 41 of rectangular shape supported in vertically spaced relation to the plate 40 by means of bolts 42. Fixed vertical guide bars 43, 43 are welded or otherwise suitably secured to the inside surfaces of the frame 41. The cartons, placed flatwise in the magazine, are releasably held therein by inwardly projecting, rounded ends of short retaining bolts 44, 44 which are threadably secured in the lower ends of the bars 43. By a slight downward flexing of the flat carton its edge portions can be caused to slide past the rounded ends of bolts 44 thus enabling the carton to be discharged from the magazine.

The cartons are withdrawn singly from each magazine by means of suction cup gripping members, one of which is indicated at 46 and illustrated in detail in Fig. 10 for magazine 32. Magazine 32a has an identical gripping member 47, indicated in the schematic view Fig. 4. The gripping members are identical in construction and, as will later be more fully described, these members are operated so that one is at its lowered position while the other is in raised position, thereby withdrawing cartons alternately at regular intervals from the magazines.

As illustrated, the gripping members comprise four upwardly extended arms 48, 48, each having ducts 49 therein, and terminating at their upper ends in suction cups 50, 50. The arms 48 are joined at their lower ends and are carried on the upper end of a hollow rod 51, vertically slidable in a block 52 which is rockably supported on pins 53, 53, having their ends supported in depending bracket members 54, 54 secured on the underside of plate 40.

Centrally below each carton magazine there is formed in the plate 40 an opening through which the arms with the suction cups may pass to permit the suction cups to contact the lowermost carton to grip it and carry it down past the retaining-bolt ends 44 until it comes to rest upon the edge portions of the plate 40 around the opening.

Figure 11:
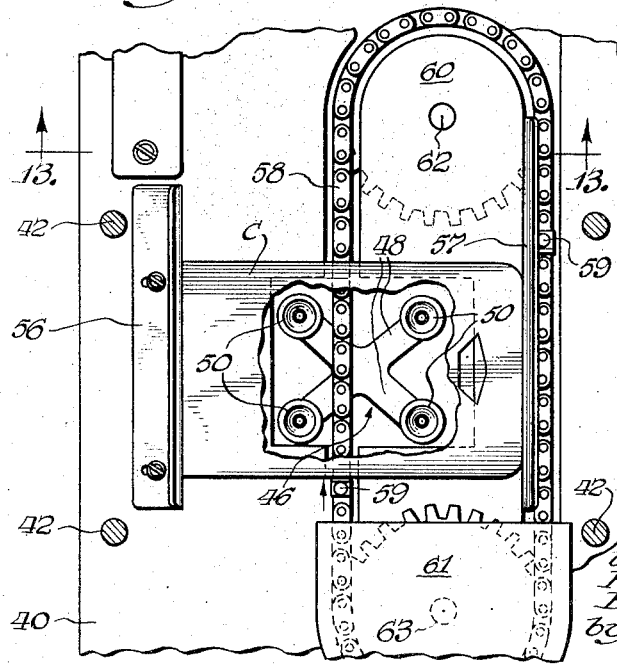
Fig. 11 is a fragmentary horizontal view, partly in section, taken along line 11—11 of Fig. 10, looking in the direction of the arrows.
Figure 12:
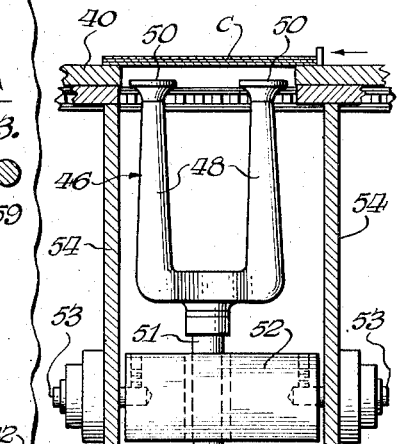
Fig. 12 is a detail sectional view, taken along line 12—12 of Fig. 10, looking in the direction of the arrows, showing the flat-carton withdrawing mechanism, as viewed from the front of the machine.

When the carton has been brought to rest upon the plate 40, it is then ready to be moved laterally toward the loading conveyer. Guide members 56 and 57 are suitably secured on the plate 40 to position the carton properly and a chain feeding conveyer 58, having spaced lugs 59, 59, secured to certain of the links, serves to advance the cartons. As shown in Fig. 11 a lug 59 is ready to engage the edge of carton C that has just been deposited on plate 40.

The chain conveyer passes around suitable sprockets 60 and 61 mounted on vertical shafts 62 and 63. As shown in Fig. 4, the shaft 62 for sprocket 60 is the driven shaft and has a gear 64 thereon meshing with a gear 64a secured on one end of a shaft 65 having a gear 65a secured to its other end which meshes with a gear 66 on a shaft 67 driven from the loading conveyer driving shaft, to be described later. The conveyer lug will carry the folded carton from the position shown in Fig. 11 to the position shown in Fig. 14 where the carton will then be acted upon by expanding members.

The means for raising and lowering the flat carton gripper to withdraw the carton from the magazine comprises a pivotably mounted rocker arm 55, having one end pivotally joined to the lower end of rod 51 and the other end provided with an anti-friction roller projecting laterally therefrom and extending into an eccentric cam groove 55a in a disc 55b, keyed onto the shaft 67 which forms part of the driving means for the feeding conveyer. As the shaft 67 rotates carrying with it the cam disc 55b the cam and roller arrangement will cause the rocker arm 55 to go through one cycle of raising and lowering with each rotation and, since the magazine discharge gripper is driven from the same shaft as the feeding conveyer, the two will operate synchronously.

The arrangement of the drive for the discharge grippers 46 and 47 is such that they will operate alternately one half cycle apart and the feeding conveyers will operate accordingly.

The control of the source of vacuum to the suction cups will be described in due course.

*Carton expanding mechanism*

Each carton, after leaving the feeding conveyer is first reversely folded to prebreak the score lines and then while it remains substantially in such reversely folded or collapsed condition, it is fed into the loading conveyer pocket, after which it is brought to fully expanded condition. Referring to Figs. 11 and 14, it is to be observed that the conveyer lugs 59 will move each flat-folded carton a distance somewhat greater than its width—that is, from the position shown in Fig. 11 to the position shown in Fig. 14. After the conveyer lug 59 reaches its extreme advanced position on the periphery of sprocket 60 it passes out of contact with the carton and returns toward sprocket 61 preparatory to engagement with the trailing edge of another carton fed from the magazine. The carton is thus delivered by the conveyer to the reverse fold station at the end of the conveyer. The driving relationship is such that after a carton has been delivered to the reverse fold station it will remain at such station while the reverse folding operation is taking place. By the time the reverse folding is accomplished the next advancing carton will be brought into contact with the reverse folded carton and will push it a distance equal to the carton width. Thus, the oncoming carton removes the reverse folded carton from this station and is itself properly positioned in such station ready to be reversely folded.

Referring now to Figs. 14, 15 and 17 to 22 inclusive, the reverse fold mechanism comprises essentially upper and lower suction gripping members, indicated as a whole at 68 and 69; carton guide arms 70, 70 and 71, 71; and folded carton-retaining detents 72, 72 and 73, 73. Figs. 17 and 21 illustrate the positions of the guide arms while a flat-folded carton is being advanced by the conveyer 58 into the reverse fold station. While the carton is being so advanced the movement of the suction gripping members is so controlled that the upper and lower suction cups 76 and 77 thereon will still be spaced sufficiently from each other to allow for unobstructed edgewise movement of the flat-folded carton therebetween.

Beyond the discharge end of conveyer 58 at the location of the reverse fold station the supporting plate 40 is cut away to form an opening 78 somewhat wider than the length of the carton. This opening permits the opposite carton sides to be swung freely upward and downward respectively from flat to fully expanded position and thence to approximately their reverse folded condition.

The handle portion H of the carton is guided edgewise between upper and lower guide bars 79, 79 secured to a narrow bar 80 of a thickness slightly greater than the handle thickness. The assembled bars 79 and 80 are secured along the free edge portion of the plate 40 at the opening 78. In order further to support the carton as it is moved to the reverse fold station rollers 81 and 82 are provided which are freely rotatable in the U-shaped end portions of the arms 70 and 71. As the carton is discharged by the conveyer and comes to rest at the reverse fold station the handle portion is held from either up or down movement by the guide bars 79, 79 and held from endwise movement in the direction of the top edge of the handle by the edge of bar 80. The outer body portions of the carton, specifically, as herein illustrated, the flat folded top walls and parts of the flat-folded side walls are engaged and supported by the upper rollers 81 and lower rollers 82 which serve additionally as guiding means for the edgewise moving flat cartons before they are reversely folded.

A plate 83 is preferably employed to serve as a guiding member for the lower edges of the carton side walls, or left hand edge of the folded carton as viewed in Fig. 14.

Just after the carton comes to rest at the reverse fold station the suction members are actuated to bring the suction cups into contact with the carton side walls, as shown in Fig. 17, after which suction is applied to cause the cups to grip the flat folded side walls. The suction members are then actuated to cause them to separate from each other and at the same time they are moved in coordination with the swinging movement of the side walls through arcs substantially equal to the widths of the carton top and bottom wall sections T, T' and B, B'. This movement is continued to the fully expanded condition of the carton, as shown in Fig. 18, and thence on beyond to approximately a reverse folded condition, as shown in Fig. 19.

After the suction members have contacted the carton side walls the guide arms 70 and 71 are caused to swing away from each other to positions beyond the farthest outward swing of the side walls, see Fig. 18, so as to avoid interference with the expansion of the carton by the suction gripping members.

As soon as the guide arms 70 and 71 begin their separating movement the suction gripping members are actuated to cause the side walls to swing toward the fully expanded condition of the carton. The suction gripping members continue their swinging movement and are caused again to approach each other, until the carton is brought to the desired reverse folded condition, as seen in Fig. 19. For clarity of illustration the reverse folded condition of the carton is shown somewhat more open in Fig. 19 than is the case in practice.

The guide arms are caused to follow the walls of the carton as they move toward reverse folded condition and come to rest in contact with the carton side walls, as shown in Fig. 19.

When the side walls have moved to fully expanded condition and have started well on their way toward reverse folded condition the vacuum to the suction cups 76 and 77 is preferably discontinued.

Auxiliary holding means are provided for retaining the cartons in their reverse folded condition so that the suction gripping members may be free to return to their starting point, ready to receive and reversely fold the next oncoming carton. For this purpose the retaining detents 72 and 73 are employed. Each of these detents is pivoted intermediate its ends at 85 on a bracket 86 secured to vertically disposed plate or housing members 87, 87. Springs 88 connected with the detents at their extremities remote from the carton hold the detents in approximately vertical position. The pressure of the hinge or fold connection between the top walls and side walls will cause the free ends of the detents to swing toward the right, as viewed in the drawings, permitting the hinge connection to slide past the detent free end. When this occurs and the side walls have been moved sufficiently toward reverse folded condition, the springs will cause the free ends of the detents to swing to their vertical positions in which the free ends will engage endwise against the side walls. Thus the reverse folded carton will be held by the detents as well as the rollers 81 and 82 on the guide arms. See Fig. 19.

The mechanism for controlling the movements of the suction gripping members and carton guide arms will now be described. Referring to Figs. 20, 21 and 22, the upstanding plates 87, 87 are suitably secured to the horizontal plate 40. Two horizontally extending rods 90 and 91, aligned vertically, are journalled in openings in the vertical plates and these rods have pivoted thereon the inner ends of the guide arms 70 and 71. The arms are disposed along the outside of the plates 87, the spacing of the arms being such that the rollers 81, 82 will be clear of the suction gripping members and will be able to engage the carton walls along their edge portions. Each vertical pair of arms 70 and 71 has secured at their inner ends meshing gears 92 and 93 of equal size, and arm 71, as herein shown, is formed with a curved rearward extension arm 94, having an antifriction roller 95 at its rear free end bearing on a cam 96 rotatably carried by a driven shaft 97, journalled in one of the upstanding plates 87 and journalled in another plate 98 disposed parallel to plate 87. Something less than 180° of the cam surface is concentric with the shaft 97 while the remainder of the cam has an eccentric portion 99 which, when rotated counterclockwise in contact with the end of extension arm 94 will cause the arm to be tilted on the rod 91 to produce downward swinging of the carton contacting end of arm 70.

Due to the provision of meshing gears 92 and 93 secured on the arms 70 and 71, the arm 70 will be caused to swing upward to the same extent as the downward swinging of arm 71. A spring 100 is provided, having one end secured to the rearward arm extension 94 and the other end secured at 101 on a stationary part of the machine frame. When the crest of the eccentric portion of the cam has passed the end of the arm extension, the spring 100 will cause downward swinging of the arm extension which will cause the roller ends of arms 70 and 71 again to approach each other.

For the purpose of adjusting the cam 96 angularly with respect to its driving gear 102 fixed on shaft 97, the cam is formed with a plurality of concentric slots 103 through which bolts 104 are inserted. When the bolt heads are tightened against the cam, it will be held in fixed relation to the gear. By loosening the bolts and swinging the cam angularly the cam may be secured in a new position so that the cycle of opening and closing of the roller ends of arms 70 and 71 may be advanced or retarded with respect to the rotation of shaft 97. The gear 102 is driven by an intermeshing gear 105, fixed on a driven shaft 106, journalled in plates 87 and 98. See Fig. 20. The shaft 106 is driven by other gearing to be described below.

The suction gripping members 68 and 69 are preferably in the form of elongated arms mounted for retractive movement while at the same time movable substantially in parallelism. To accomplish this the member 68 is formed with downwardly extending portions 109, 110 and the member 69 is formed with similar upwardly extending portions 111 and 112. Each of these extensions is bifurcated and apertured to receive hinge pins 113. Each hinge pin has a link member 114, 115 connected to the pin at one end and each terminating at the other end in pinions 116, 117 rotatable upon a spindle or rod. In the present instance the upper and lower pinions 117 are for convenience mounted to oscillate on rods 90 and 91 which carry gears 92 and 93. The pinions 116 are mounted to oscillate on rods 118 and 119 having their ends secured in apertures formed in the vertical plates 87, 87. The centers of rods 90, 91, 118 and 119 are located in rectangular relation and the links, being equal in length, movement of the gripping member arms on this linkage system will cause them to remain in parallelism.

For the purpose of controlling the gripping member arms to separate or move toward each other and to be advanced and retracted in synchronism, the pinions 116 and 117 are identical in size and in their tooth spacing and are meshed with a rack bar 120 having teeth on both upper and lower sides. This rack bar is connected by a pivoted link 121 to a crank 122 secured on a disc member 123 keyed to the shaft 97. The link 121 is formed with a turnbuckle adjustment 124 so that its length can be altered in order to vary the opening and closing of the gripper arms.

It is apparent that, for each rotation of shaft 97, the disc 123 and the cam 96 will each be carried through a complete rotation. This drives the gripping arms, carrying the suction cups, and the roller guide arms through one complete cycle. This will cause a carton to be moved from its flat folded condition to a reversely folded condition. The mechanism for controlling the source of vacuum to the gripper arm suction cups 76 and 77 will presently be described.

*Discharge of cartons from reverse fold station*

During the time a flat-folded carton is being conveyed from its discharge point below the supply magazine, by a lug 59 on the conveyer 58, to a point where its advancing edge meets the trailing edge of a carton at the reverse fold station, the carton at this station will have been brought from its flat to its reverse folded condition. The top and bottom rollers 81 and 82 in the guide arms are then substantially in the position shown in Fig. 19, and the detents 73 will be in endwise contact with the carton side walls. The source of vacuum will have been cut off from the suction cups, and the gripper arms will be moving both away from each other and forwardly under the influence of the rotating crank mechanism 123 which reciprocates the rack bar 120. The reverse folded carton is then free to move between rollers 81 and 82, and it is moved onwardly out of the reverse fold station by the oncoming flat carton propelled by the conveyor lug 59. Such oncoming carton continues to move until the conveyor lug has reached the limit of its travel around the end of sprocket 60. The flat carton thus will displace the reverse folded carton while the latter will come to rest immediately alongside the reverse fold station.

The handle portion of the ejected, reverse folded carton will be retained in the handle guide formed by bars 79, 79, and the bottom portion of the carton will be supported on a guide plate 128 secured to an inward extended section 129 on the plate 83. The carton is retained in its reverse folded condition by a hold-down member 130 bolted on a horizontal frame bar 131. The end of the member is preferably curved to facilitate movement of the carton therebeneath. The carton, when delivered to this point, is then ready to be brought back from reverse folded condition toward its expanded condition and delivered to the carton conveyer to be carried past the can loading stations. As will be later more fully described the carton is delivered to the conveyer while still in a partially expanded condition.

Carton loading conveyer

The conveyer 30 comprises essentially a series of pockets open on three sides. The pockets are formed by T-shaped members each having a outwardly projecting flight portion 133 having its inner end joined centrally to a supporting member 134. The supporting members 134 are provided with lugs 135, 135 (see Figs. 14 and 27) having projecting leg portions 136, 136 formed with openings to receive pins 137. Links 138 connect the pins of one T-shaped member at both edges to its adjacent member. The length of the individual links is such that the adjacent ends of the supporting portions 134, 134 will be spaced sufficiently to receive the carton handles therebetween. See Figs. 2, 16 and 26.

The supporting members and links thus comprise in effect a sprocket chain which is arranged over a plurality of pairs of sprockets 141, 142, 143 and 144, mounted respectively on shafts 145, 146, 147 and the driving shaft 106, referred to previously. See Fig. 4.

Guide channels 151, 152, 153 and 154 are secured to the machine frame to guide the conveyer pocket forming members along fixed paths. Anti-friction rollers 155 are provided on the outer ends of the pins 137 (see Figs. 14, 25, 27 and 28) and are received into the interior portions of the channels.

Delivery of cartons into loading conveyer

When a carton has been ejected from the reverse fold station as above described, such ejected carton advances the previously ejected carton into the loading conveyer 30. As the carton passes out from beneath the hold-down member 130 the side walls begin to move toward expanded position due to the tendency of the paperboard to resist folding. The movement toward expanded position is still incomplete as the conveyer pocket is moving into position. Thus the carton is able to move freely into the pocket since the pocket is of the size of a fully expanded carton.

The path of movement of the conveyer 30 with respect to the path along which the reverse folded carton is moving is offset so that the carton will be inserted into the pocket with a substantial part of the carton projecting. See Fig. 16. The carton is caused to move fully into the pocket by means of cams or guide rails 159, 159 secured at their lower ends to a horizontal part of the machine frame and inclining upwardly and inwardly toward the conveyer. The rails then extend upward beyond the inwardly inclined portion in close relation to the open front faces of the pockets. At the place where the conveyer pocket members pass around the sprockets 141, the rails 159, 159 are offset outwardly so as to clear the corners of the cartons but assure their maintenance on the conveyer. On the upper section of the conveyer the rails 159, 159 again are disposed in close proximity to the exposed carton bottom surfaces.

For the purpose of assuring prompt emplacement of the cartons in the pockets as well as proper squaring up of the carton, air jets issuing from tubes 160, 160 are preferably employed to direct a flow of air under pressure against the carton bottom panels.

Delivery of a single can to each compartment

After the expanded carton has been delivered to the loading conveyer a single can is delivered to each carton compartment at the loading station 33. Filled and sealed cans are conducted to the loading station 33 by a suitable chute 161 along which the cans roll by gravity. A star wheel assembly is employed to remove cans singly from the lower end of the chute and deposit them singly in the cartons. Bearing members 162 are supported on the horizontal frame member 17 close to the vertical section of the conveyer 30. A shaft 163 is journalled in this bearing. Two spaced discs or plates 164, 164 are secured on the shaft to rotate therewith. Each of the discs is formed with a plurality of rounded notches in its periphery so as to receive cans delivered from the chute. The spacing of the discs is preferably such that the outer vertical surfaces of the discs will contact the cans inwardly of their chimes. The notches, indicated at 165, 165 are formed in pairs spaced closely so that the cans therein are substantially in contact with each other. The cans held in each pair of notches are destined for the adjacent compartments in a single carton. Between the pairs of notches 165, 165 are projecting portions 166 having a rounded surface and extending sufficiently around the can to assist in propelling the cans into the cartons on the loading conveyer.

On the outside vertical surface of each of the discs 164 is a disc 170 on the exterior of which can-engaging spring fingers 171 are secured to extend radially outward. There is a spring finger located at each can-retaining notch in the inner discs 164. The spring fingers are tensioned to move inwardly of the star wheel assembly, that is, toward each other so as to adapt them to grip the opposite ends of the individual cans. For the purpose of permitting the can to move by gravity into position to be grasped by a pair of spring fingers, cam guides 172, 172 are secured to the chute 161, one on each side. See Fig. 24. The cam guide surfaces diverge downwardly so that the spring fingers, turning counter clockwise, as viewed in Fig. 23, will ride freely onto the guides at their upper portions and will be caused to spread outwardly to clear the ends of a can as the fingers travel downwardly of the guides.

After a can has rolled freely into a notch further rotation of the star wheel causes the fingers to ride past the ends of the cam guides and will then be free to exert a gripping action on the can ends. The gripping force is preferably only sufficient to keep the cans aligned with the carton compartments. In order to retain the cans in the notches a circular retention or guide member 173 is provided suitably secured to the machine frame. This retention member preferably extends from the can chute to a point adjacent the loading conveyer.

The spring fingers preferably have an inward curvature at their ends so that they will extend around the ends of the cans to enable the fingers to enter the open ends of the carton compartments and guide the cans in their movement therein. The rotation of the star wheel is suitably synchronized with the conveyer movement so that the end portions of the spring fingers will swing into and out of the compartments without engagement with the carton sides or partition walls. Also the synchronization is such that the projecting portions 166 will move in substantial registration with the outwardly extending portions 133 of the conveyer. Thus, as a pair of cans is brought around the curved guide 173 to the loading point propelled forward by the projecting portion 166, the first can of the pair is ready to enter the leading compartment.

In order to move the can inwardly there is provided a vertically disposed cam guide 176 secured to the machine frame and having a free end portion projecting downwardly in between the discs 164 of the turret member. See Figs. 23 and 24. The cam guide has an inclined face extending from a lower point, where it will normally engage the can periphery at approximately the point of contact of the can in the curved notch on the star wheel, to an upper point where it is in close proximity with the open lateral sides of the conveyer pockets. When a can makes contact with the cam guide 176, being propelled by the projecting portion 166, it will be forced laterally to the right, as viewed in Fig. 23, and begins to enter the carton compartment. It will slide or roll into the compartment between the spring fingers 171, 171, the ends of which have entered the compartment just prior to the time when the can between the spring fingers engages the end of the cam guide.

When the can has moved upward a short distance along the cam guide it will have also moved inward of the carton compartment sufficiently that the engagement of the can with the carton partition or carton side will continue the upward propulsion of the can, causing the cam guide to continue forcing the can laterally until the can is half-way or somewhat more than half-way into the carton compartment. Thus it will have no tendency to fall out of the carton after the can passes beyond the influence of the cam guide.

Figure 23:
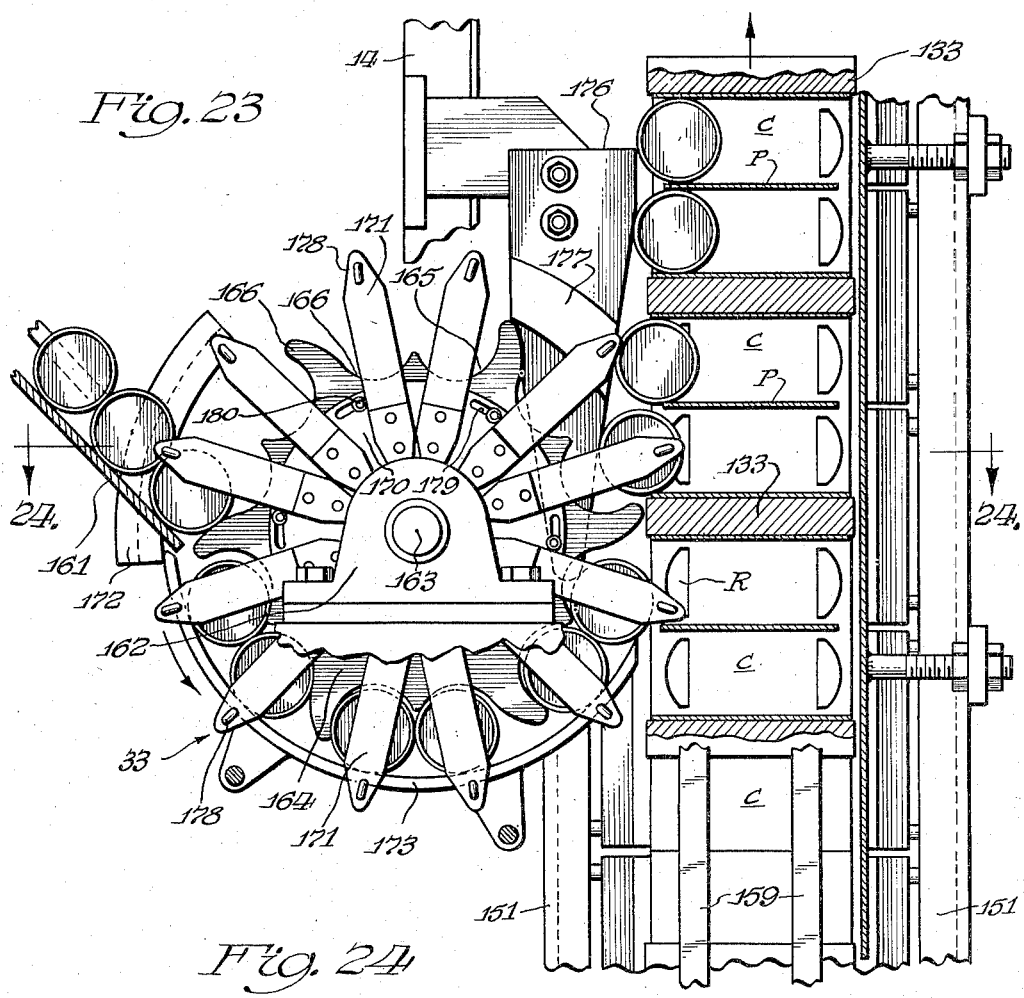
Fig. 23 is a fragmentary side elevational view, on an enlarged scale, of a portion of the front of the machine, as viewed in Fig. 1, with some of the cartons and parts of the conveyor shown in section, and illustrating the manner of delivering the first can to each of the carton compartments.
Figure 24:
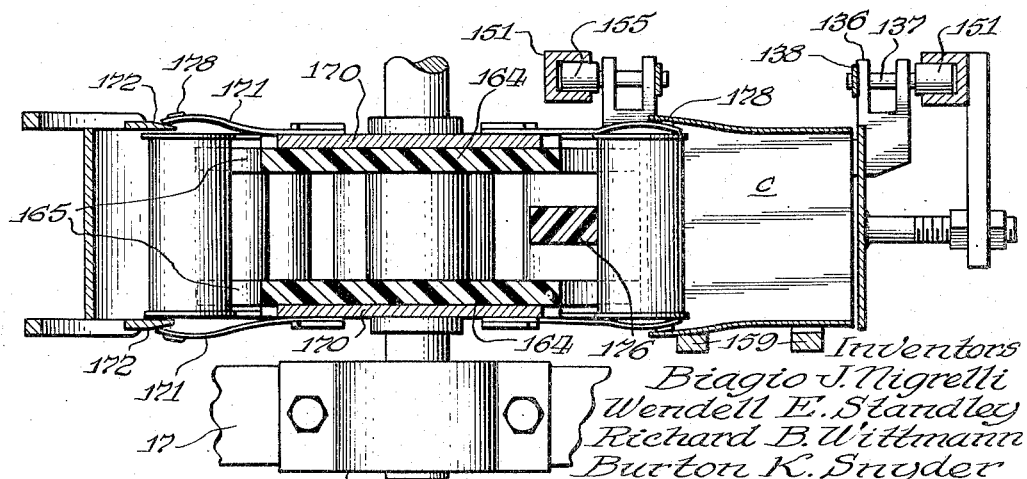
Fig. 24 is a sectional view, taken on line 24—24 of Fig. 23, illustrating the operation of the spring fingers on the star wheel which deliver the cans to the cartons, the carton walls being shown as deflected in a somewhat exaggerated manner for clarity in demonstrating the relationship of parts.

As the cans are forced inwardly of the cartons by the cam 176 the cans will be forced out from between the ends of the spring fingers 171, as seen in Fig. 23. In order to prevent undue abrasion of the sides of the cam 176 an upwardly and outwardly flaring plate 177 is secured upon each of the lateral surfaces of the cam 176. Thus, as the ends of the spring fingers slip off the can ends, they will move along the plate 176 on each side of the cam and thereby wear on the cam itself will be prevented. When the plates 176 become worn they may easily be replaced.

A small nub 178 is preferably formed on each spring finger, extending outwardly so as to come into contact with the can retaining tab. See Fig. 23. The nub, upon contacting the tab will move it slightly out of the plane of its attached wall where it will be held frictionally due to contact with the material of the wall adjacent the tab. This will assure that the tab edge will not project into the carton compartment where it might offer undesirable resistance to movement of the can ends along the top and bottom panels of the carton.

The discs 170 are preferably formed with curved slots 179 through which project bolts 180 threaded into openings in discs 164. By this arrangement the angular positions of discs 164 and 170 may be suitably adjusted so as to change the positions of fingers 171 with respect to the notches 165.

It is to be understood that the paperboard employed for the cartons will be relatively thin and the spring fingers will be made of very thin spring steel or other suitable material. However, for clarity in Fig. 23, the thicknesses are somewhat exaggerated as well as the deflection of the top and bottom wall panels of the carton. In practice the deflection of the wall panels is very slight.

*Folding the can retaining tabs*

After the first can has been inserted into each compartment of each carton the cartons in the conveyor move upwardly and thence around the sprocket 141 onto the horizontal portion ready to be conveyed past station 34 where the retaining tabs are folded through approximately 180° to condition the tabs for engagement with the chimes of additional cans to be loaded into the cartons. It is an important feature of this invention to utilize the first can to be inserted in each compartment as a part of the means for folding the tabs into position. The can is moved to a position adjacent one set of tabs while folding elements move the tabs through 90°. The presence of the can permits adequate force to be exerted on the tab but at the same time maintains the top and bottom walls firmly against the can ends and avoids any tendency to tearing of the paperboard around the tabs. The can is then moved to a position adjacent the other two tabs of the compartment to repeat the folding operation at this end of the carton.

Referring first to Figs. 2, 25, 27, 28 and 29, the carton conveyor 30 moves horizontally past a pair of finger wheels 182, 182 mounted to rotate in horizontal planes upon a vertical shaft 183 journalled in the machine frame. The shaft 183 in the present instance is connected by a universal joint to a connecting shaft 184, which in turn is connected to a short shaft 185 extending from gear box 186. See Fig. 2. The finger members 188 are grouped in pairs with spaces between the pairs compensating for the thickness of the conveyer members 133 which form the carton pockets. The length of the fingers 188 is such that the finger will enter the carton compartment and move over each of the first cans introduced therein so that the advancing edge of the can will come to rest adjacent the hinge of the retaining tab on the top and bottom wall panels. See Figs. 27 and 28.

After the cans are moved into position by the fingers 188 the cartons are conveyed past upper and lower finger wheels 191 and 192 having fingers 193 and 194 thereon, arranged in pairs to agree with the spacing of the compartments on the loading conveyer similar to the spacing of the fingers on finger wheel 182. The finger wheels are disposed to rotate in vertical planes and are keyed to horizontal shafts 195 and 196 journalled in bearings carried by the machine frame. The driving gear for these shafts will be described presently. These finger wheels will, of course, be driven in synchronism with the conveyer and the fingers are adapted to contact the retaining tabs and fold them toward the interior of the compartments through a 90° angle.

In order to give the finger members 194 access to the retaining tabs, tapered openings 199 are formed in the carton supporting member 134 of the conveyer. See Figs. 27 and 29.

Following the action of folding the first set of tabs through a 90° angle, the cans in each compartment are preferably moved laterally to the opposite sets of tabs so that they also may be folded. Immediately following the can movement the tabs preferably are folded to a further extent so that their total deflection approximaes 180°. In the present instance these two operations are performed substantially simultaneously and with the same mechanism. For this purpose, a pair of finger wheels 200, 200 is provided, rotatable in horizontal planes and secured on a vertical shaft 201. See Figs. 2, 25, 30 and 31. The shaft 201 is journalled in bearings on the machine frame and is connected through flexible couplings and short shafts to gearing in gear box 202. The wheels 200 have fingers 203 extending therefrom in spaced pairs similar to the previously described finger wheels. These fingers are of a length comparable to the length of the fingers on wheels 182 so as to move the can lengthwise in each compartment to come to rest with the advancing edge of the can positioned at the retaining tab hinge line. See Fig. 31.

At the same time that the cans are moved lengthwise of the compartment the tabs which were previously folded inwardly of the compartment by the finger wheels 191 and 192 are folded through a further angle whereby they are brought substantially into contact with the panels on which the tabs are supported. This is accomplished by providing short rounded end pins 206 secured in openings in the fingers 203 a short distance from their ends. See Figs. 30 and 31. As in the case of the other finger wheels, the wheels 200 are operated synchronously with the conveyer movement so that the ends of the fingers move into and out of the compartments as the cartons are carried past without interference with the carton side walls or partitions.

As soon as the cartons have been acted upon by wheels 200 they are ready to have the remaining tabs moved inward through 90°. This is done by upper and lower finger wheels 209, 210 which have spaced pairs of fingers 211 and 212 identical with finger wheels 191 and 192. The wheels 209 and 210 are secured on horizontal shafts 213 and 214 mounted in bearings on the machine frame. Sprockets 215 and 216 are secured on shafts 213 and 214 respectively and are driven by sprocket chains 217 and 218 passing respectively around sprockets on the shafts 195 and 196.

An additional sprocket 221 (see Figs. 25 and 27) is secured on shaft 195 and is driven by a sprocket chain 222 passing around a sprocket 223 on a shaft 224 journalled on the machine frame. The shaft 224 is in turn driven from a shaft 225 by means of intermeshing gears 226 and 227 secured on such respective shafts. The shaft 225 has a sprocket 228 secured at its end and is driven by chain 229 passing over a sprocket 230 on shaft 145 which also carries one set of sprockets for the loading conveyer. See Figs. 2 and 25.

The two lower finger wheels are also driven from the shaft 145 by means of a sprocket 233 on shaft 145 (see Fig. 26) over which passes a sprocket chain 234, which in turn passes around a sprocket 235 on the shaft 196.

After the cartons are carried beyond the influence of the finger wheels 209 and 210 they are ready for the last conditioning operation prior to the loading of the last two cans in each compartment. That is, the final tabs are folded through the remainder of approximately 180°. This is effected by a pair of horizontally disposed finger wheels 240, 240 mounted on a vertical shaft 241 journalled on the machine frame. See Figs. 25 and 30. The wheels 240 have finger members 242 thereon arranged in spaced pairs similar to the previously described finger wheels to agree with the spacing of the carton compartments and with the greater spacing between individual cartons on the conveyer.

The fingers 242 are similar to fingers 203 on wheels 200 except that they are shorter and perform the dual function of moving the can in the compartments and folding the tabs through approximately the remainder of a 180° angle. The reason fingers 242 are shorter is that the cans in each compartment need only be displaced inward to a central position, see Figs. 32 and 33, whereas the fingers 203 are long enough to move cans from a point adjacent one set of tabs to a point adjacent the set of tabs at the other end of the carton, see Fig. 31.

Similar to fingers 203 the fingers 242 are provided with short rounded-end pins 243, secured in openings adjacent the ends of the individual fingers (see Fig. 30) so as to engage the inwardly projecting tabs and fold them through a further angle whereby they are brought substantially into contact with the panels on which the tabs are supported.

After the cartons have passed out of range and influence of finger wheel 240 the cartons will be in the condition of the carton illustrated in Fig. 33. That is, both sets of tabs in each compartment of the carton will have been folded over to lie closely adjacent its attached wall and the single can in each compartment will be located in a central position therein, a small distance away from contact with the free ends of the folded-over tabs. The cartons are then ready to move to the final loading station to receive two additional cans in each compartment.

*Loading final cans into cartons*

The cartons with a single can in each compartment are carried from the tab folding station upon the horizontal, upper reach of the conveyer around sprocket 142 to the vertical reach of the conveyer where the cartons are carried downward to the last loading station 35. Referring to Figs. 1, 2, 34 and 35, the cans for final loading into the cartons are carried preferably by gravity to the loading station by means of two inclined chutes 247 and 248 each of which carries a single line of cans. The loading of the cans into the cartons at station 35 is effected by star wheel assemblies quite similar in most respects to the star wheel assembly shown in Fig. 23, except that the cans are fed from the chutes over the star wheels instead of under the wheel, as in the case of loading the initial can in each compartment.

The star wheel assemblies are identical in construction and are mounted generally in tangential relation to the conveyer, one on each side of the descending leg. The wheels are carried on shafts 251 and 252. See Figs. 2, 26 and 34. Shaft 251 is connected with a stub shaft 253 which enters and is driven from gear box 202. Shaft 252 is connected to a stub shaft 254 which enters gear box 186 from which in turn, shaft 184 is driven. See Fig. 26. Shaft 252 has a gear 255 thereon meshing with a gear 256 on driven shaft 163 on which the star wheel at the initial loading station 33 is secured. See Fig. 23. A sprocket 257 is secured on shaft 163 and is in driving connection with a sprocket 258 on shaft 251 by means of a sprocket chain 259 running over both sprockets. See Figs. 2 and 26. Thus the shaft 251, driven from gear box 202, transmits torque to shaft 163 through chain drive 258; and shaft 163 drives shaft 252 through gears 256 and 255.

Each star wheel comprises two axially spaced discs or plates 263, 263, secured on their respective shafts 251 and 252 to rotate therewith. As viewed in Fig. 34, the star wheel assembly on shaft 251 is rotated clockwise and its companion is rotated counterclockwise. The discs 263 are formed with a plurality of aligned, rounded notches in their peripheries so that each pair of aligned notches is adapted to receive cans delivered from the chute. The axial spacing of the discs is preferably such that the outer surfaces of the discs will contact the cans inwardly of their chimes. The notches, indicated at 264, 264, are formed in closely spaced pairs in which the cans are substantially in contact with each other. Each pair of cans is destined for adjacent compartments of a carton. Between the pairs of notches 264, 264 are projecting portions 265 having rounded surfaces conforming to the circumference of the can and extending sufficiently around the can to assist in retention of the cans in position prior to delivery to the cartons on the conveyer. These portions 265, similar to portions 166 on the initial can loading star wheel, conform in circumferential extent to the spacing between the cartons on the conveyer.

On the outside surface of each disc 263 is a disc 266 on the exterior of which can retaining spring fingers 267 are secured to extend radially outward. There is a spring finger located at each can retaining notch in the inner discs 263. The spring fingers are tensioned to move toward each other so as to grip the opposite ends of cans held in the notches.

For the purpose of permitting cans to move by gravity into the aligned notches the spring fingers are held temporarily in positions so that they cannot engage the can ends. To effect this result cam guide members 268 are secured, one on each side of the chute leading to each star wheel. The lower portions of the cam guides are inclined outwardly and upwardly so that the fingers will normally ride upon the cam and will be deflected axially outward to spread adjacent fingers apart during the time a can is rolling from the end of the chute into the curved notches on the discs 266. As soon as the can is received in the notches the spring fingers, upon further rotation of the star wheel will pass off the ends of the cams, whereupon their normal tensioning will cause them to grip the can ends.

The circumferential speed of the spring fingers is synchronized with the speed of the carton loading conveyor so that the ends of the fingers will pass into the open ends of the carton compartments and will pass out again as the fingers are carried around by the rotation of the star wheel. As the pairs of cans in the juxtaposed notches travel downward they come into registration with the open carton ends and each can successively comes into contact with a vertically disposed stationary cam member 270 or 270' having an inwardly and downwardly curved surface which, as the can moves therealong, will force the cans into position within the carton. In like manner to the construction of the star wheel assembly at station 33, see Fig. 24, the cam member 270 is secured intermediate the axially spaced discs 263, 263.

As shown in Fig. 34 cam members 270 are carried on a bracket 271 secured on an upright frame member. Slots 272 are formed in the bracket to receive bolts 273 passing through the cam member. Set screws 274, 274 threaded through a part 275 bear against the surface of the cam member 270 and serve as means for adjusting the member laterally as well as means for adjusting its angular position with respect to a perpendicular line if such adjustment is found necessary.

In bringing cans into the carton compartments it is to be noted that the curved ends of the spring fingers 267 first enter the compartments and come into wiping contact with the can retaining tabs r', r' which will tend to move the tabs closely against their individual supporting walls. See Fig. 35. During the time that the spring fingers are in contact with the tabs the can which is adjacent the compartment into which the fingers project, will move into contact with the vertical cam surface and will begin a lateral motion into the carton due to the downward propulsion of the projecting portions 265 bearing against one of each pair of closely related cans. The relationship is such that the advancing ends of the can will move along the thin spring finger and will overlie the tab an appreciable distance beyond the tab hinge before the spring finger will be withdrawn from the carton compartment. This assures that the chime of the can will not come into edge contact with the hinge of the tab which might tear the carton and otherwise disrupt the smooth operation of the machine.

As the filled cartons travel downward along the cam members 270 and 270' the outer can at each end of each compartment will be brought substantially to its final position which is that each outer can will be in contact with the center can and will have its chimes engaged by the retaining tabs which will be disposed adjacent the can ends. A portion of each end can will preferably project outwardly from the carton ends.

In practice the fit of the retaining tabs against the can chimes is designed with a very small degree of tolerance. For proper loading, the retaining tabs not only should be in edgewise engagement with the inner portion of the can chime but they also should lie substantially flatwise against the can ends. In such position the natural tendency of the tabs to move away from a complete 180° fold will tend to cause them to bear with a certain amount of tension on the can ends and inside the chime. This tendency keeps the edge of the tab against the inner part of the chime.

In order to assure the desired relationship between the retaining tabs and chimes it is desirable to shift or jog the cans slightly in the cartons. For this purpose the cam members 270 and 270' are formed with complementary surfaces 277 and 278, the former being convex and the latter being concave. When the outer can at the left, as viewed in Fig. 34, contacts the convex surface 277, the entire row is shifted to the right. This shifting is controlled by the complementary surface 278.

Two additional complementary surfaces are preferably provided, shown at 279 on member 270' and at 280 on member 270, the surface 279 being convex and the surface 280 being concave. As the rows pass these latter surfaces the cans are shifted to the left. This slight shifting of the rows, first in one direction and then in the other, tends to assure accurate positioning of the retaining tabs at each end of the carton.

When the filled cartons travel down below the jogging elements they are ready to be discharged from the machine. As shown in Fig. 2, a suitable conveyor 281 is provided with its receiving end arranged just below the point where the carton conveyor meets sprocket 143. Passage of the link sections of the conveyor around this sprocket causes the pocket forming members 133 to separate and the filled carton will slide off the member 133 when it has reached a sufficiently steep inclination.

For the purpose of synchronizing the operation of the mechanism for reverse folding the cartons and loading them into the conveyor pockets with the carton conveyor, gears 285, 285 (see Fig. 4) are secured on shafts 67, 67 to mesh with gears 105, 105 fixed on the ends of shaft 106 on which one set of sprockets 144, 144 for the carton conveyor is secured.

The cam members 55b at opposite sides of the expanded carton conveyor are placed 180° apart, and likewise the crank connection with discs 123 for the reverse folding elements, and the cams 96 for the guide arms 70, are placed 180° apart, so that the two groups of carton treating and feeding mechanisms will deliver cartons to alternate pockets of the carton conveyor. See Fig. 4.

The control of vacuum to each of the flat carton gripping members 46, 46 is effected by a controlled valve, one of which is shown at 286 in Fig. 10, having a stem actuating link 287 controlled by the rotation of cam 288 on a shaft 289. See also Figs. 1 and 4. The cam shaft 289 is journalled in suitable bearings on the machine frame and carries a sprocket over which passes a chain 290, passing around a sprocket secured on shaft 67.

Two valves, not shown, but identical with valve 286, are employed to control the vacuum to the respective suction gripping members 68 and 69 to effect reverse folding of the cartons. These are controlled by identical cams 291, 291, see Figs. 1 and 4, on shaft 289. The two opposite groups of cams 288 and 291 are secured on shaft 289 so that their operating surfaces are 180° apart which will actuate the control valves in harmony with the action of the respective gripping members.

The machine is driven by a motor 292 connected with gearing in a variable-speed gear box 293 from which torque is transmitted through drive chain 294 to a sprocket on shaft 295 which in turn is connected through suitable gearing to vertical shaft 296 connected with gearing in gear box 202. The shaft 295 transmits torque to shaft 106 by means of suitable sprockets which carry sprocket chain 297. By means of a shaft 298 connected by gearing to hand crank 299 suitable variations in speed may be made in a manner which is well known.

The machine herein disclosed is well adapted for the loading of cans into open end cartons and particularly the type of carton having chime engaging flaps located inwardly of the end edges of the top and bottom walls. By providing two sets of carton treating and feeding mechanisms operating alternately on opposite sides to deliver expanded cartons in to the conveyor pockets it is possible to obtain a substantially high rate of can loading. Due to the use of the initial can which is delivered into each compartment of the carton in assisting in the operation of folding the retaining flaps, the mechanism is thereby greatly simplified over prior machines for handling internal tab cartons.

By constructing the machine so that the carton conveyor describes a rectangular path in a vertical plane with loading of the carton into the conveyor and the loading of the initial can into each compartment taking place in the ascending run, the conditioning of the tabs in the horizontal run, and loading of the final cans in the descending run of the conveyor the advantage of compactness is gained. This is a very desirable feature to users where floor space is limited. While the contour of the conveyor and the arrangement of the various stations is important such contour and arrangement are not essential and it is within the scope of the invention to vary the particular configuration of the conveyor and the positioning of the carton feeding, treating and loading stations.

The construction of the machine furthermore permits the advantageous use of numerous safety features such as, for example, to provide for stopping the delivery of cans in the event of the non-delivery of a carton to the carton conveyor. Thus, with suitable controls in operation, the machine can operate at reduced capacity by leaving one carton magazine without a supply of cartons and allowing the machine to continue to operate with expanded cartons placed in every other conveyor pocket.

While the foregoing description sets forth a preferred embodiment of the invention it is apparent that numerous changes may be made in the mechanism described without departing from the spirit of the invention, and it is desired that the present embodiment be considered in all respects as illustrative rather than restrictive, reference being had to the appended claims rather than to the foregoing description to indicate the scope of the invention.

What is claimed is:

1. In a loading machine for open ended, can receiving cartons of the type having a hinged can chime retaining-tab spaced inward from the open end of the carton and formed within the contour of a wall with which a can end is adapted to contact, a conveyer member adapted to carry such open end cartons at right angles to the carton axes through the open ends, means for delivering a can into a carton carried by the conveyer so that the can end is in contact with the carton wall that carries the retaining tab, means for moving a can within the carton to a position in which the can is disposed inwardly of the tab-hinge, means for driving the conveyer, and means operable in time with the conveyer to exert pressure against the free portion of a tab to cause it to swing upon its hinge through a substantial angle while the wall of the carton that carries the retaining tab is supported from inward movement by the can positioned within the carton.

2. In a loading machine for open-ended, can receiving cartons of the type having a hinged can chime retaining-tab spaced inward from an open end of the carton and formed within the contour of a wall with which a can end is adapted to contact, a conveyer member having outstanding carrier elements forming open end pockets to receive open end cartons, means for delivering a can into a carton held in a pocket on the conveyer so that the can end is in contact with the carton wall that carries the retaining tab, means for moving a can within the carton to a position in which the can is disposed inwardly of the tab hinge, to permit swinging of the retaining-tab interiorly of the carton, means for driving the conveyer, and a finger member movable in time with the conveyer to extend into the interior of a carton on the conveyer, the finger member being adapted to engage the free edge portion of a tab and fold it through a substantial angle while the wall of the carton that carries the retaining tab is supported from inward movement by the can positioned within the carton.

3. In a machine for placing cans into open end cartons of the type having a center partition to provide two compartments therein, a conveyer, spacer members carried by the conveyer forming open-end pockets adapted to receive and carry such partitioned, two-compartment cartons in erected form, a rotatable turret in tangential proximity to the conveyer formed with radially disposed notches to receive cans, said notches being grouped in circumferentially spaced pairs, whereby the individual cans of each pair when placed therein are substantially in contact with each other, each of the notch-forming portions of the turret between the spaced pairs of notches being of a thickness measured circumferentially corresponding to the pocket-forming members carried by the conveyer, a can supply means to deliver cans into successive notches, means adapted to move cans from said pairs of notches of the turret into tangentially adjacent compartments in the individual cartons carried by the conveyer, and means for driving the conveyer and turret in timed relation to cause the notch-forming portions between spaced pairs of notches to move in registering relation with the pocket forming members, whereby the cans comprising each juxtaposed pair of cans in the notches will be delivered into the two compartments of individual cartons carried by the conveyer pockets.

4. Mechanism as defined in claim 3, in which the turret member comprises two axially spaced discs in which the can notches are formed, in combination with a cam member disposed adjacent the path of the conveyer and between the discs to move cans from the notches into the cartons.

5. Mechanism as defined in claim 3, in which radially disposed, resilient finger members are carried by the turret disposed at each of the notches, the outer end portions of the finger members being adapted to move into and out of the open ends of the compartments of cartons carried in the conveyer pockets and guide the cans as the cam member forces the cans out of the notches and into the carton compartments.

6. In a machine for placing cans into open end, sleeve type cartons having opposed walls in which can chime engaging tabs are formed entirely within the wall contour by cutting and creasing, and such tabs being adapted to swing inwardly of the carton, a conveyer adapted to receive and carry erected cartons, a turret member rotatably mounted in tangential proximity to the conveyer formed with radially disposed notches to receive cans, radially projecting, resilient finger members carried by the turret disposed at each of the notches, the outer end portions of the finger members being adapted to move into and out of the open ends of cartons carried by the conveyer and in wiping engagement with the carton walls carrying the chime engaging tabs, means acting upon rotation of the turret to move cans from the notches past the end portions of the resilient fingers and into cartons carried by the conveyor, the resilient fingers having outwardly extending nubs adapted to engage and displace the chime engaging tabs outwardly of the carton walls, whereby to assure that the free edge portions of the tabs will be cleared from interference with a can moving into the carton.

7. In a machine for loading cans into cartons formed of foldable paperboard of the type having two side walls, a center-hinged top panel and a center-hinged bottom panel, each hinged at their outer edges to the top and bottom respectively of the side walls, and having a center partition wall hinged at the center-hinge of the top and bottom panels to provide a two-compartment, open-end carton adapted to be manufactured in flat folded condition with the halves of the bottom panel disposed flat against each other and the side walls and top panel halves folded flat against the partition, a loading conveyer extending in a fixed path, means for continuously driving the conveyer, the conveyer comprising a plurality of flight members to form open-end pockets, such flight members extending at right angles to the path of the conveyer and spaced apart a distance conforming to the distance between the carton side walls when in erected position, means for reversely folding the carton whereby the halves of the bottom panel will swing over to lie against the partition, means for holding the partition panel against endwise movement during swinging movement of the side, bottom and top panels to reverse folded condition, means for holding the carton in reversely folded position, conveying means for discharging a reversely folded carton from the holding means to permit it to re-expand due to the tendency of the paperboard to resist reverse folding, such conveying means being adapted to convey a carton from the holding means directly into the path of the loading conveyer, and means for driving such conveying means in time with the loading conveyer, whereby a partially expanded carton will be delivered to a loading conveyer pocket during continuous movement of the conveyer.

8. Mechanism as defined in claim 10, in which the path of the conveying means to deliver a partially expanded carton to the loading conveyer is offset outwardly from a direct alignment with the pocket forming members, whereby the partially expanded cartons will be inserted into the conveyer pockets with the bottom portion projecting from the front of the pocket, and means for forcing the carton completely into the pocket.

9. Mechanism as defined in claim 7, in which the pockets on the loading conveyer are open on the front and two sides and duplicate but, alternately actuating, reverse fold mechanisms and conveying mechanisms for delivery of partially expanded cartons to the loading conveyer are disposed on opposite sides of the path of movement of the conveyer pockets, in combination with driving means for the separate sets of mechanisms timed with movement of the loading conveyer to cause partially expanded cartons to be delivered from each side individually to alternate conveyer pockets.

10. In a machine for loading cans into cartons formed of foldable paperboard of the type having two side walls, a center-hinged top panel and a center-hinged bottom panel, each hinged at their outer edges to the top and bottoms respectively of the side walls, and having a center partition wall hinged at the center-hinge of the top and bottom panels to provide a two-compartment, open-end carton adapted to be manufactured in flat folded condition with the halves of the bottom panel disposed flat against each other and the side walls and top panel halves folded flat against the partition, a loading conveyer extending in a fixed path, means for driving the conveyer at constant speed, the conveyor comprising a plurality of pocket forming members extending at right angles to the path of the conveyer and spaced apart a distance conforming to the distance between the carton side walls when the carton is in erected condition, a reverse fold mechanism comprising oppositely acting sets of suction cups adapted, when suction is applied thereto, to grip the outer surfaces of the flat folded carton side walls, supporting members for the suction cups, mechanism for moving such members simultaneously through opposed curved paths to a position in which the carton is fully expanded and thence to a further position to bring the carton substantially to a fully collapsed, reverse folded condition in which the halves of the bottom panel will lie against the partition, means for holding the partition panel against endwise movement during swinging movement of the side, bottom and top panels to reverse folded condition, means for applying suction to the suction cups during movement of the suction cup supporting members from collapsed to reversely folded positions of the carton, means for holding the carton in reversely folded position, the mechanism for moving the suction cup supporting members also including means for returning such members to starting position, conveying means for discharging a reversely folded carton from the holding means to permit it to re-expand due to the tendency of the paperboard to resist reverse folding, such conveying means being driven in time with the loading conveyer, whereby a partially expanded carton will be delivered to a loading conveyer pocket during constant movement of the conveyer.

11. In a loading machine for open ended, can receiving cartons of the type having a can chime retaining-tab spaced inward from the open end of the carton and formed within the contour of a wall with which a can end is adapted to contact, a conveyer member adapted to carry such open end cartons at right angles to the axes through the open ends, means for delivering a can into a carton carried by the conveyer so that the can end is in contact with the carton wall that carries the retaining tab, means for moving a can within the carton to a position in which the can is disposed inwardly of the tab hinge, means for driving the conveyer to advance cartons thereon, means operable along the path of the conveyed cartons to exert pressure against the free portion of a can retaining-tab to cause it to be folded upon its hinge through approximately a 90° angle while the wall of the carton that carries the retaining tab is supported from inward movement by the can positioned within the carton, and means operable at a point along the conveyer path beyond such tab folding means for further folding the tab inwardly of the carton substantially beyond a 90° angle with respect to its carrying wall, whereby the carton is conditioned to receive an additional can to be brought into chime engaging position with respect to the infolded tab.

12. In a loading machine for open ended, can receiving cartons of the type having a can chime retaining-tab spaced inward from the open end of the carton and formed within the contour of a wall with which a can end is adapted to contact, a conveyer member adapted to carry such open end cartons at right angles to the axes through the open ends, means for delivering a can into a carton carried by the conveyer so that the can is in contact with the carton wall that carries the retaining tab, means for moving a can within the carton to a position in which the can is disposed inwardly of the tab hinge, means for driving the conveyer to advance cartons thereon, means operable along the path of the conveyed cartons to exert pressure against the free portion of a can retaining-tab to cause it to be folded upon its hinge through approximately a 90° angle while the wall of the carton that carries the tab is supported from inward movement by the can positioned within the carton, a rotatable finger member disposed at a point along the conveyer path beyond such tab folding means adapted to swing into the open end of the carton to engage the can therein and move it laterally beyond the retaining-tab, means on the rotatable finger member adapted to engage the retaining-tab and fold it beyond a 90° angle with respect to its original position, whereby the carton is conditioned to receive an additional can to be brought into chime engaging position with respect to the infolded tab, and means for driving the rotatable finger member in time with the conveyer.

13. In a loading machine for open ended, can receiving cartons of the type having a can chime retaining-tab spaced inward from each of the open ends of the carton and formed within the contour of a wall with which a can end is adapted to contact, a conveyer member adapted to carry such open end cartons at right angles to the axes through the open ends, means for delivering a can into a carton carried by the conveyer so that the can end is in contact with the carton wall that carries the retaining-tabs, means for moving a can bodily past a tab at one end of the carton wall to a position in which the can is disposed inwardly of the hinge of the tab at the other end of the carton, means for driving the conveyer to advance cartons thereon, means operable along the path of the conveyed cartons to exert pressure against the free portion of such can retaining-tab to cause it to be folded upon its hinge through a substantial angle while the wall portion that carries the tab is supported from inward movement by the can positioned within the carton, a rotatable finger member disposed at a point along the conveyer path beyond such tab folding means adapted to swing into the open end of the carton to engage the can therein and move it reversely to a position where the can will be brought adjacent the hinge of the first mentioned tab, means on the rotatable finger member adapted to engage the folded retaining-tab and fold it beyond a 90° angle with respect to its original position, whereby the carton is conditioned to receive an additional can to be brought into chime engaging position with respect to the infolded tab, and means for driving the rotatable finger member in time with the conveyer.

14. In a machine for loading cans into open end cartons having top, bottom and side walls and adapted to receive cans in two adjacent rows, a conveyer, spacer members carried by the conveyer forming open-end pockets adapted to receive and carry such cartons in erected form, a rotatable turret in tangential proximity to the conveyer formed with radially disposed notches to receive cans, said notches being grouped in circumferentially spaced pairs, whereby the individual cans of each pair, when placed therein are substantially in contact with each other, each of the notch-forming portions of the turret between the spaced pairs of notches being of a thickness measured circumferentially corresponding to the pocket forming members carried by the conveyer, a can supply means to deliver cans into successive notches, means adapted to move cans from notches of the turret into tangentially adjacent cartons carried by the conveyer, and means for driving the conveyer and turret in timed relation to cause the notch forming portions between spaced pairs of notches to move in registering relation with the pocket forming members, whereby the cans comprising each juxtaposed pair of cans in the notches will be delivered side by side in the individual cartons carried in the conveyer pockets.

15. In a machine for loading cans into cartons formed of foldable paperboard of the type having two side walls and top and bottom walls hingedly connected to the side walls along score lines to provide an expandable, open end carton adapted to be manufactured in flat folded condition, a loading conveyer extending in a fixed path, means for continuously driving the conveyer, the conveyer comprising a plurality of pocket forming members extending at right angles to the path of the conveyer and spaced apart a distance conforming to the distance between the carton side walls when in erected condition, means for folding the carton from its original flat folded condition to a reverse flat folded condition, means for temporarily holding the carton in reverse folded condition, intermittently actuating conveying means for discharging a reverse folded carton from the holding means to permit it to re-expand partially due to the tendency of the paperboard to resist reverse folding, such conveying means being adapted to carry a carton into the path of the loading conveyer, and means for driving such conveying means in time with the loading conveyer, whereby a partially expanded carton will be delivered to a loading conveyer pocket during continuous movement of the conveyer.

16. In a machine for loading rows of juxtaposed cans into open end cartons of the type having two opposite walls provided with folded chime-engaging tabs carried in each of such walls adjacent the open ends of the carton, such walls being of a length less than the length of the row of cans and the chime-engaging tabs being so disposed that the end cans of a row will project partly from the open ends of the carton, a conveyer for carrying filled cartons in side by side relation with the axes of the cartons through their open ends extending at right angles to the path of the conveyer, means disposed along the path of the conveyer for engaging an outer can in each row of cans in the cartons held on the conveyer and for moving such can through a small distance in one direction to shift the row of cans with respect to the carton to allow any improperly seated retaining-tab at the end of the carton adjacent such means to move flat against the can end and bring its edge fully into position to engage laterally against the can chime, and additional means disposed along the path of the conveyer beyond the first named means for engaging the outer can at the opposite end of the row and for moving such can through a small distance in a direction opposite to that caused by the first named means to shift the row of cans with respect to the carton to allow any improperly seated retaining tab at the opposite end of the carton likewise to move flat against the can end and bring its edge fully into position to engage laterally against the can chime.

17. In a machine for loading rows of juxtaposed cans into open end cartons of the type having two opposite walls provided with folded chime-engaging tabs carried in each of such walls adjacent the open ends of the carton, such walls being of a length less than the length of the row of cans and the chime-engaging tabs being so disposed that the end cans of a row will project partly from the open ends of the carton, a conveyer for carrying filled cartons in side by side relation with the axes of the cartons through their open ends extending at right angles to the path of the conveyer, a cam member disposed along the path of the conveyer for engaging an outer can in each row of cans in the cartons held on the conveyer and for moving such can through a small distance in one direction as the row of cans passes such cam member to shift the row of cans with respect to the carton to allow any improperly seated retaining-tab at the end of the carton adjacent such means to move flat against the can end and bring its edge fully into position to engage laterally against the can chime, and an additional cam member disposed along the path of the conveyer beyond the first named cam member for engaging the outer can at the opposite end of the row and for moving such can through a small distance in a direction opposite to that caused by the first named cam member as the row of cans passes such cam member, to shift the row of cans with respect to the carton to allow any improperly seated retaining tab at the opposite end of the carton likewise to move flat against the can end and bring its edge fully into position to engage laterally against the can chime.

18. In a loading machine for open ended, can receiving cartons of the type having a hinged can chime retaining-tab spaced inward from the open end of the carton and formed within the contour of a wall with which a can end is adapted to contact, a conveyer member adapted to carry such open end cartons, means for delivering a can into a carton carried by the conveyer to position the can with an end in contact with the carton wall carrying the retaining tab with the can disposed inwardly of the tab hinge, means for continuously driving the conveyer, and means disposed along the path of cartons moving on the conveyer and operable during movement thereof to exert inward pressure against the free portion of the tab to cause it to swing inward upon its hinge through a substantial angle while inward movement of the carton wall that carries the retaining tab is resisted by contact with the end of a can positioned within the carton.

19. In a loading machine for open ended can receiving cartons of the type having a can chime retaining-tab spaced inward from the open end of the carton and formed within the contour of a wall with which a can end is adapted to contact, a unitary conveyer member adapted to carry such open end cartons at right angles to the axes through the open ends, means for driving the conveyer continuously to advance cartons thereon, means disposed along the path of said conveyer and within the space defined by the ends of the walls bearing the can retaining tabs, movable with the carton in its continuous motion and operable through said carton wall to exert pressure against the free portion of said can-retaining tab to cause it to be folded upon its hinge through approximately a 90° angle, and means operable at a point along the path of said conveyer beyond such tab folding means for further folding the tab inwardly of the carton substantially beyond a 90° angle with respect to its carrying wall whereby to condition the carton to receive a can to be brought into chime engaging position with respect to the infolded tab.

References Cited in the file of this patent

UNITED STATES PATENTS

| | | |
|---|---|---|
| 2,358,292 | Malhiot | Sept. 12, 1944 |
| 2,382,619 | Earp | Aug. 14, 1945 |
| 2,739,430 | Griswold | Mar. 27, 1956 |
| 2,770,935 | Nigrelli | Nov. 20, 1956 |